(12) United States Patent
Long et al.

(10) Patent No.: US 12,552,316 B2
(45) Date of Patent: Feb. 17, 2026

(54) VEHICULAR MIRROR CONTROL SYSTEM

(71) Applicant: Magna Mirrors of America, Inc., Holland, MI (US)

(72) Inventors: Christopher L. Long, Big Rapids, MI (US); Anthony J. LaCross, Hastings, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 92 days.

(21) Appl. No.: 18/665,871

(22) Filed: May 16, 2024

(65) Prior Publication Data
US 2024/0383405 A1    Nov. 21, 2024

Related U.S. Application Data

(60) Provisional application No. 63/514,597, filed on Jul. 20, 2023, provisional application No. 63/502,965, filed on May 18, 2023.

(51) Int. Cl.
*B60R 1/12* (2006.01)
*B60R 1/04* (2006.01)
*B60R 1/08* (2006.01)

(52) U.S. Cl.
CPC ............... *B60R 1/12* (2013.01); *B60R 1/04* (2013.01); *B60R 1/088* (2013.01); *B60R 2001/1253* (2013.01)

(58) Field of Classification Search
CPC .. B60R 1/12; B60R 1/04; B60R 1/088; B60R 2001/1253
See application file for complete search history.

(56) References Cited

U.S. PATENT DOCUMENTS

| | | |
|---|---|---|
| 7,914,187 B2 | 3/2011 | Higgins-Luthman et al. |
| 10,017,114 B2 | 7/2018 | Bongwald |
| 10,029,614 B2 | 7/2018 | Larson |
| 10,046,706 B2 | 8/2018 | Larson et al. |
| 10,065,574 B2 | 9/2018 | Tiryaki |
| 10,166,924 B2 | 1/2019 | Baur |
| 10,421,404 B2 | 9/2019 | Larson et al. |
| 10,442,360 B2 | 10/2019 | LaCross et al. |
| 10,948,798 B2 | 3/2021 | Lynam et al. |
| 10,967,796 B2 | 4/2021 | Uken et al. |
| 11,214,199 B2 | 1/2022 | LaCross et al. |
| 11,242,008 B2 | 2/2022 | Blank et al. |
| 11,518,401 B2 | 12/2022 | Kulkarni |
| 11,582,425 B2 | 2/2023 | Liu |

(Continued)

*Primary Examiner* — Sath V Perungavoor
*Assistant Examiner* — Tyler B Edwards
(74) *Attorney, Agent, or Firm* — HONIGMAN LLP

(57) ABSTRACT

A vehicular interior rearview mirror assembly includes a mirror head adjustable relative to a mounting base. The mirror head accommodates a mirror reflective element having a transflective mirror reflector and a video display device disposed behind the mirror reflective element and operable to display video images derived from image data captured by a camera of the vehicle. The displayed video images are viewable through the transflective mirror reflector by a driver of the vehicle. Responsive to determination of a glare light source present in a field of view of the camera, intensity of a portion of the displayed video images that corresponds to the glare light source is reduced relative to adjacent portions of the displayed video images.

33 Claims, 18 Drawing Sheets

(56) References Cited

U.S. PATENT DOCUMENTS

| | | |
|---|---|---|
| 11,639,134 B1 | 5/2023 | Huizen et al. |
| 11,780,372 B2 | 10/2023 | Sobecki et al. |
| 11,827,153 B2 | 11/2023 | Miller et al. |
| 2007/0171037 A1* | 7/2007 | Schofield ................. B60Q 1/22 340/438 |
| 2012/0086808 A1* | 4/2012 | Lynam .................... B60Q 3/82 348/148 |
| 2014/0285666 A1 | 9/2014 | O'Connell et al. |
| 2014/0336876 A1 | 11/2014 | Gieseke et al. |
| 2015/0009010 A1 | 1/2015 | Biemer |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0217367 A1 | 8/2017 | Pflug et al. |
| 2017/0274906 A1 | 9/2017 | Hassan et al. |
| 2017/0355312 A1 | 12/2017 | Habibi et al. |
| 2018/0134217 A1 | 5/2018 | Peterson et al. |
| 2018/0231976 A1 | 8/2018 | Singh |
| 2019/0118717 A1 | 4/2019 | Blank et al. |
| 2019/0146297 A1 | 5/2019 | Lynam et al. |
| 2019/0210615 A1 | 7/2019 | Caron et al. |
| 2020/0143560 A1 | 5/2020 | Lu et al. |
| 2020/0202151 A1 | 6/2020 | Wacquant |
| 2020/0320320 A1 | 10/2020 | Lynam |
| 2021/0155167 A1 | 5/2021 | Lynam et al. |
| 2021/0162926 A1 | 6/2021 | Lu |
| 2021/0291739 A1 | 9/2021 | Kasarla et al. |
| 2021/0323473 A1 | 10/2021 | Peterson et al. |
| 2022/0242438 A1 | 8/2022 | Sobecki et al. |
| 2022/0254132 A1 | 8/2022 | Rother |
| 2022/0377219 A1 | 11/2022 | Conger et al. |
| 2024/0064274 A1 | 2/2024 | Blank et al. |
| 2024/0168355 A1 | 5/2024 | Baur |
| 2024/0190456 A1 | 6/2024 | P et al. |

* cited by examiner

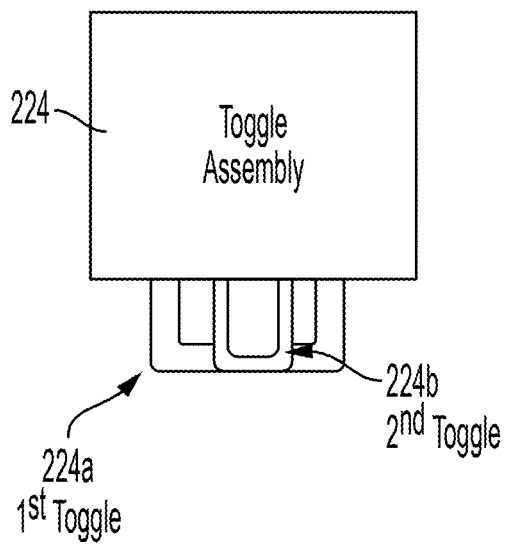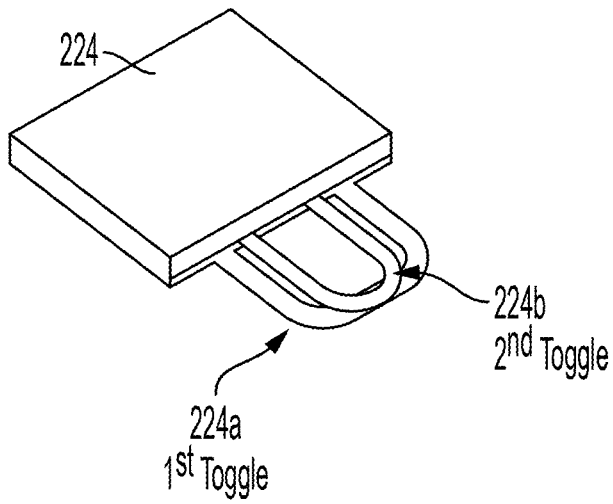
FIG. 9    FIG. 10
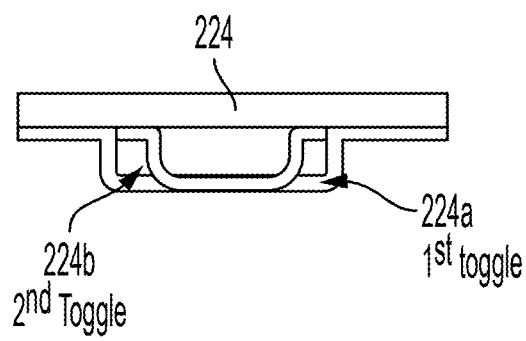
FIG. 11

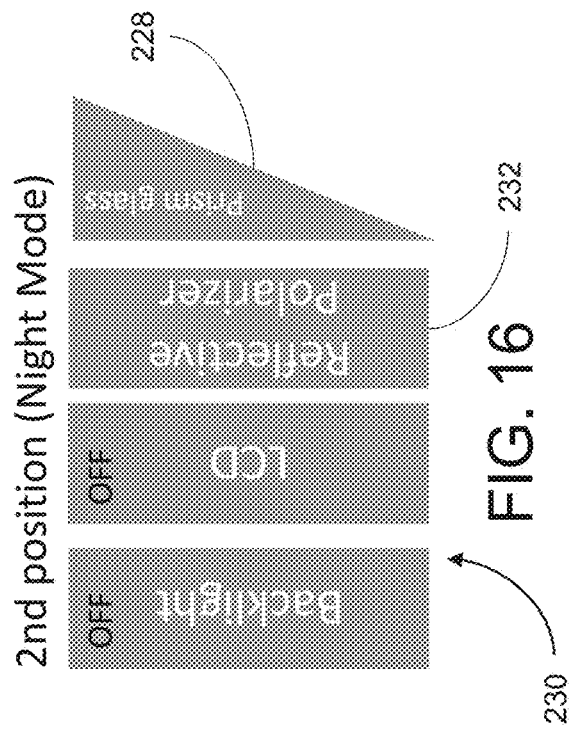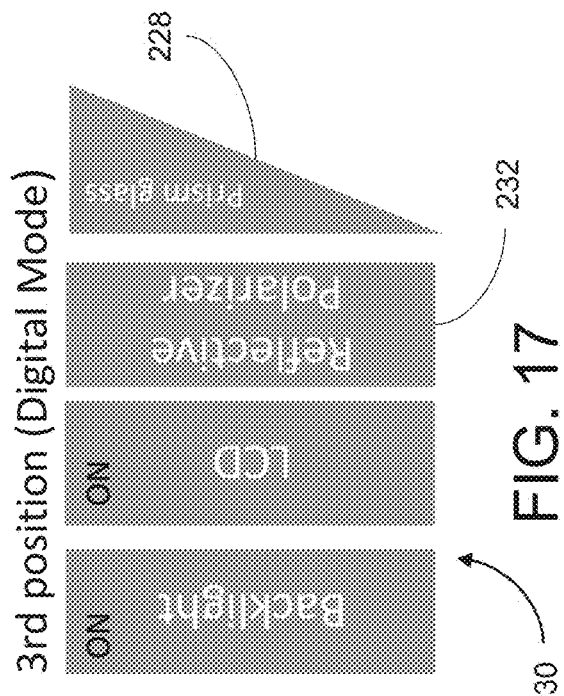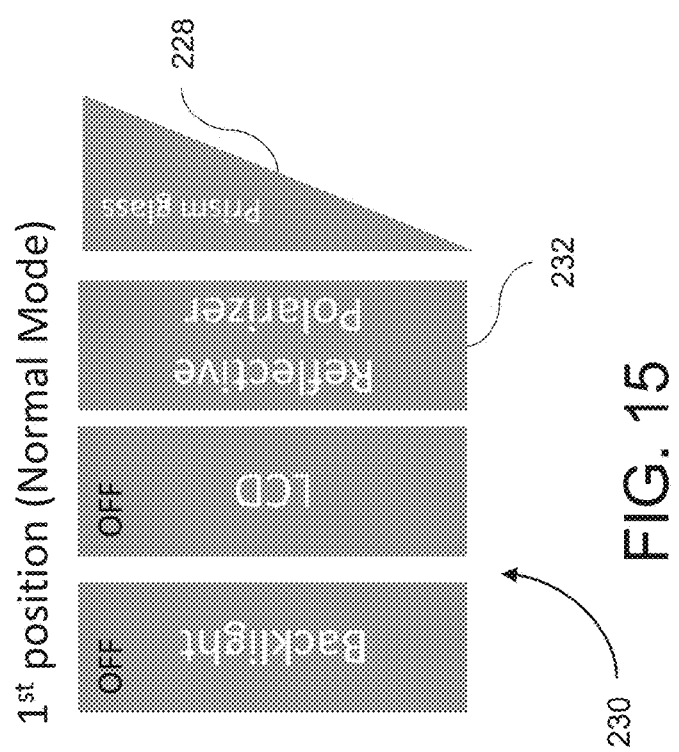

| Part # | |
|---|---|
| 1 | Stay |
| 2 | Socket |
| 3 | Socket Mount |
| 4 | Star Cam |
| 5 | Arc Cam |
| 6 | Snap Ring |
| 7 | Toggle |

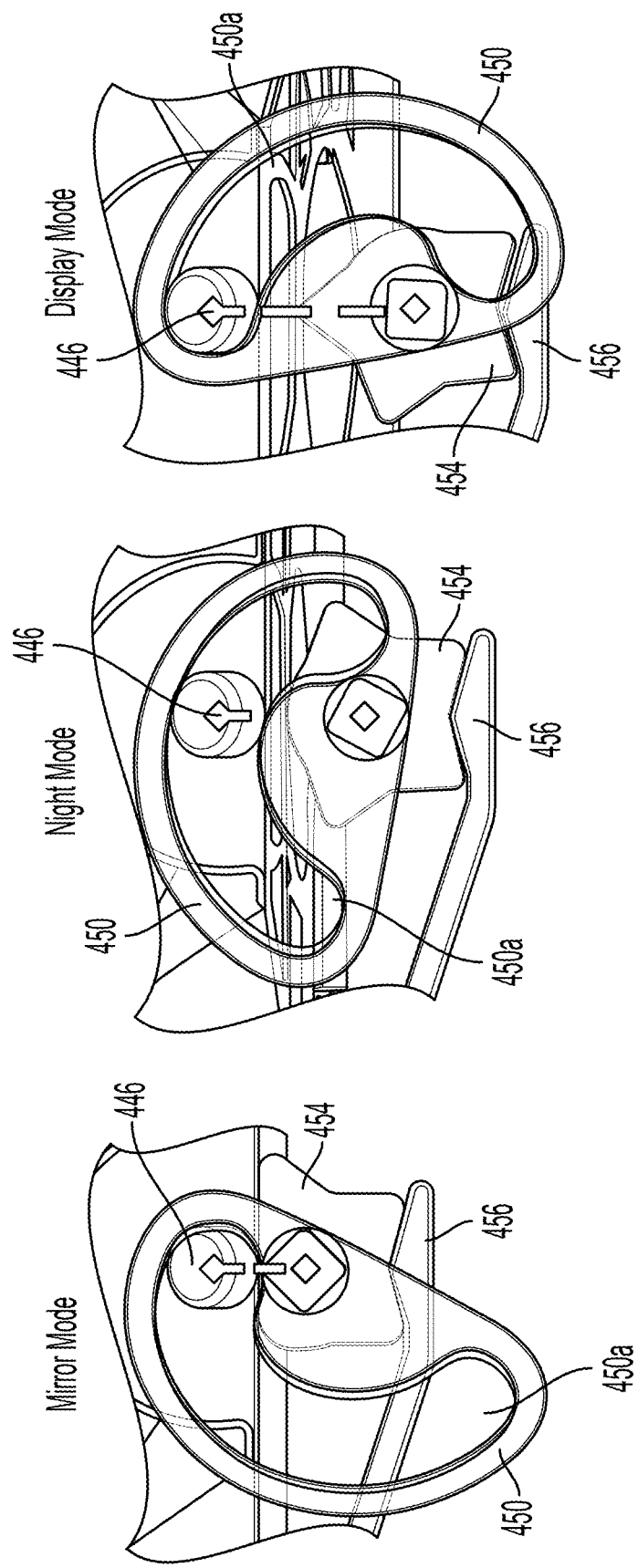

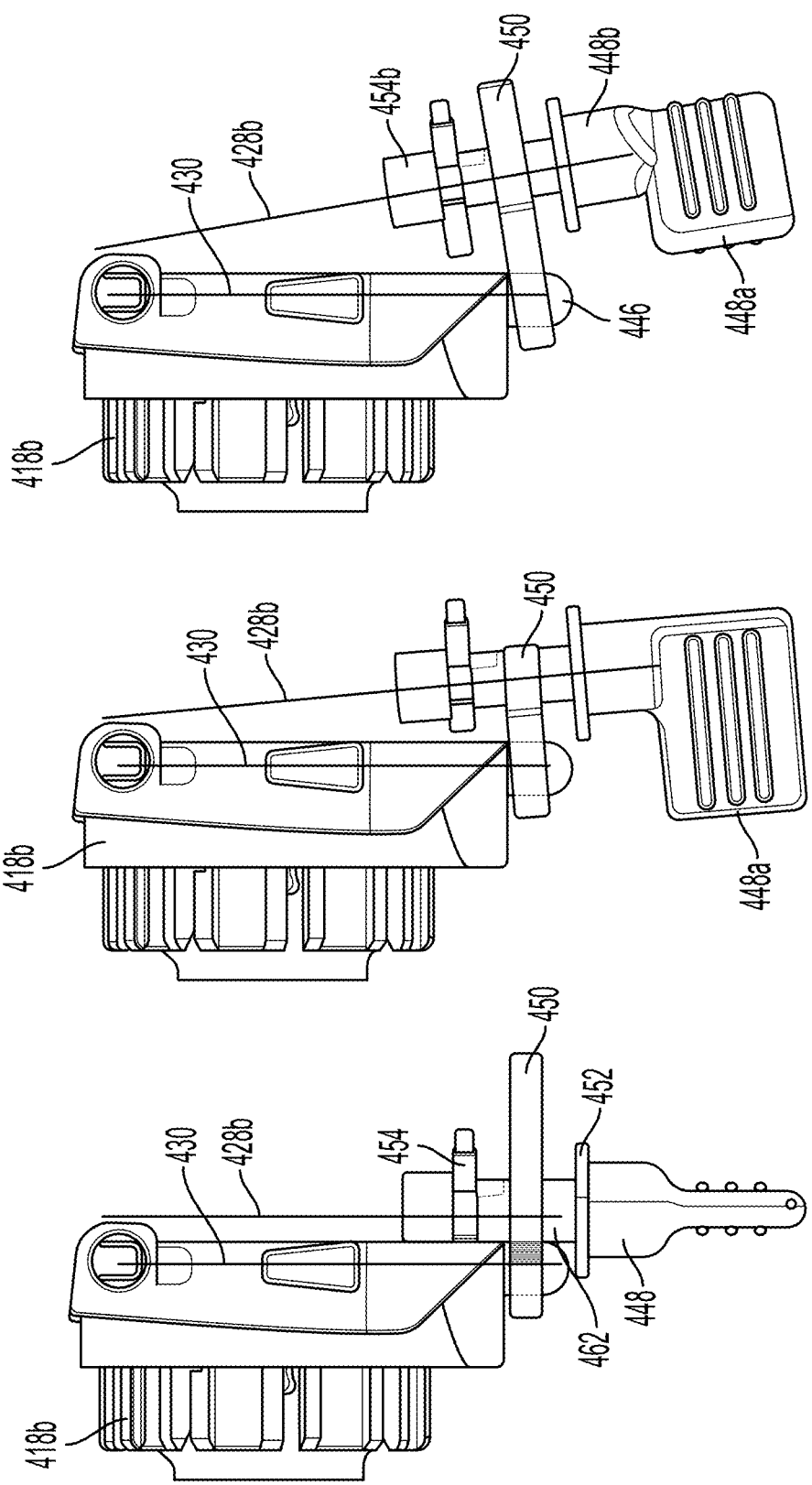

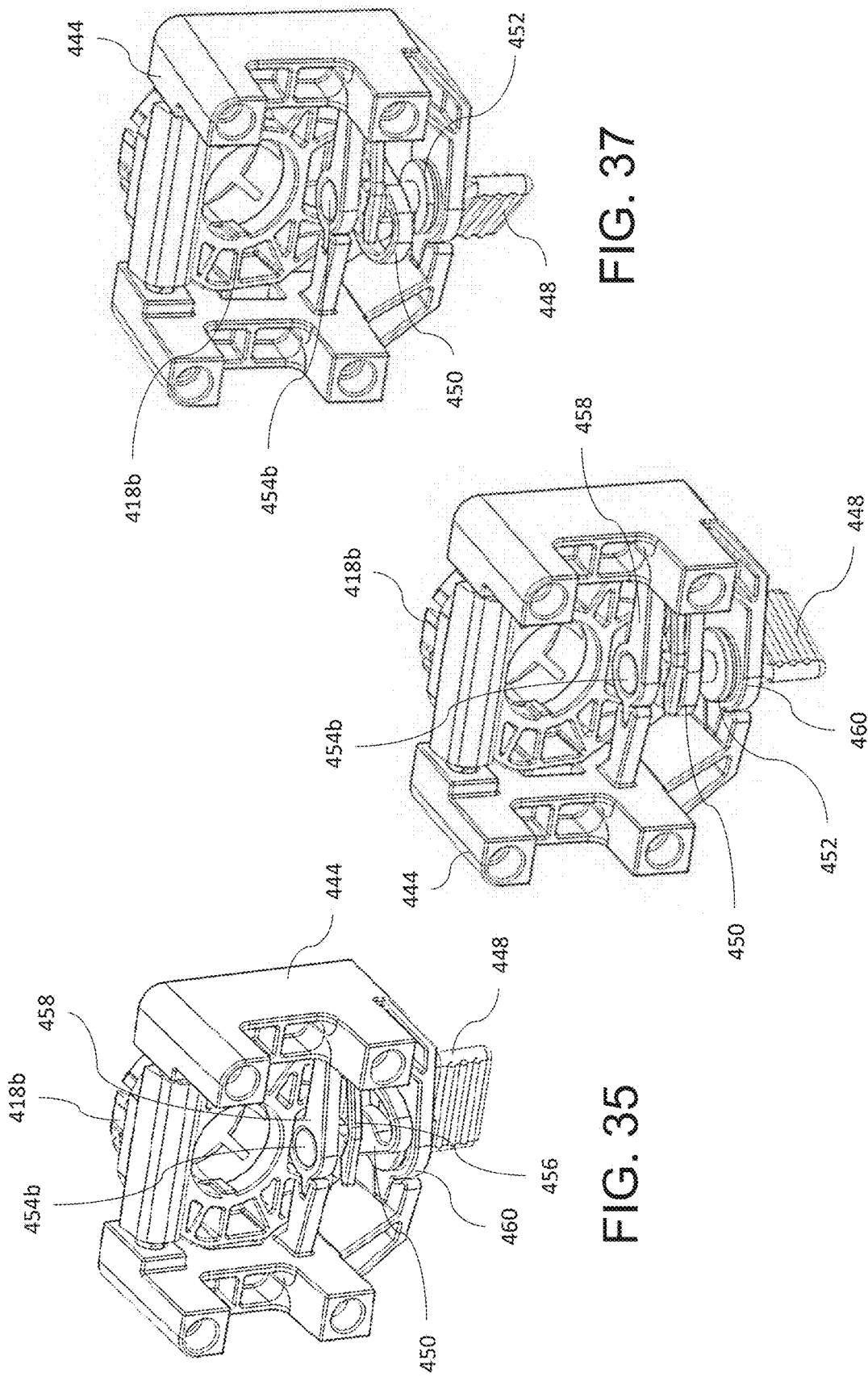

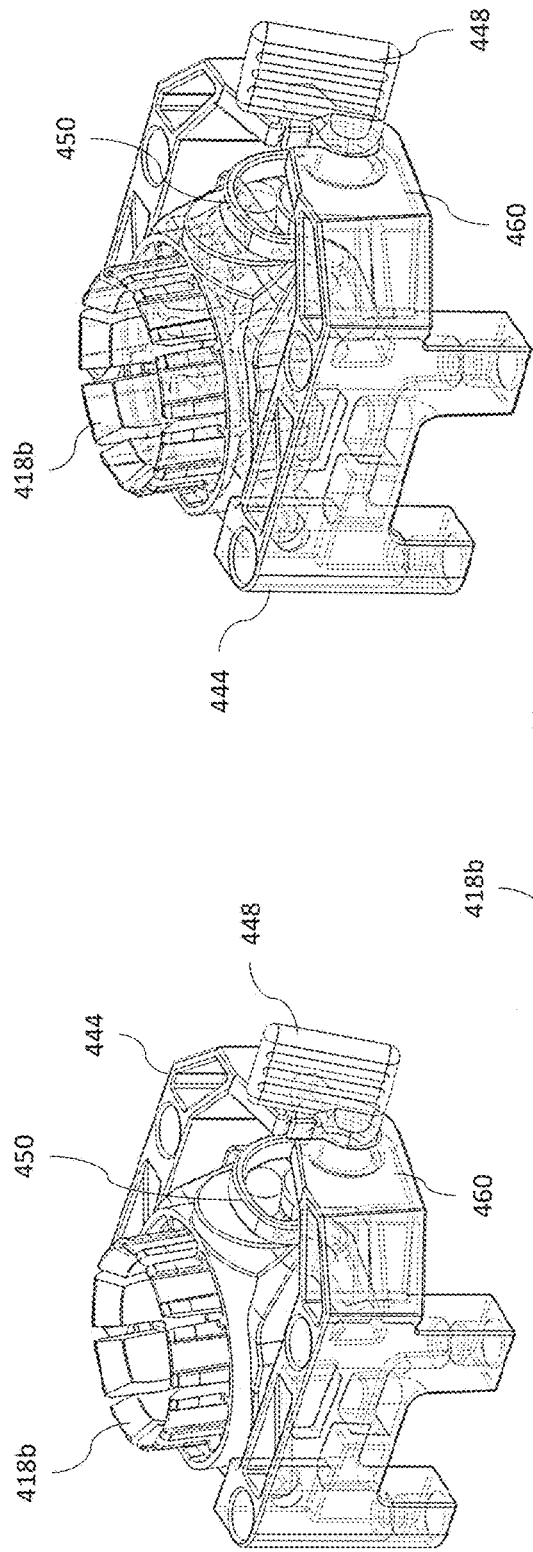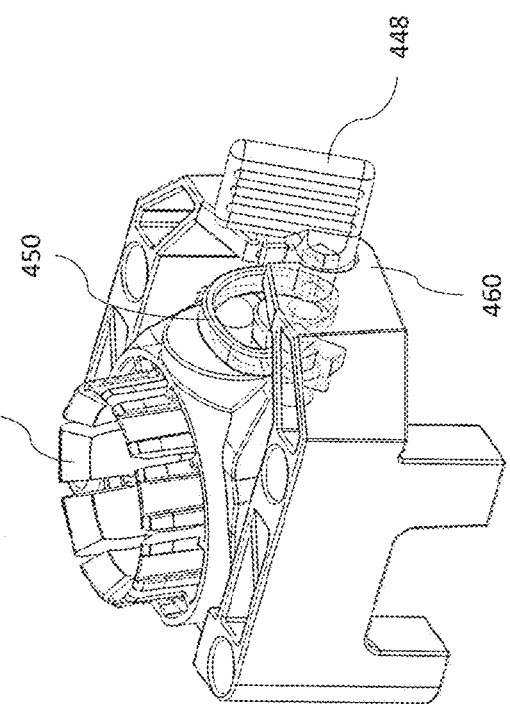
FIG. 40
FIG. 39
FIG. 38

VEHICULAR MIRROR CONTROL SYSTEM

CROSS REFERENCE TO RELATED APPLICATIONS

The present application claims the filing benefits of U.S. provisional application Ser. No. 63/514,597, filed Jul. 20, 2023, and U.S. provisional application Ser. No. 63/502,965, filed May 18, 2023, which are hereby incorporated herein by reference in their entireties.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

A vehicular interior rearview mirror assembly includes a mounting structure configured to attach at an interior portion of a cabin of a vehicle equipped with the vehicular rearview mirror assembly. A mirror head accommodates a mirror reflective element. With the mounting structure attached at the interior portion of the cabin of the vehicle, the mirror head is adjustable by a driver of the vehicle to set a rearward view for the driver. A video display device is disposed rearward of the mirror reflective element, and the video display device is operable to display video images captured by a rearward viewing camera of the vehicle. With the mounting structure attached at the interior portion of the cabin of the vehicle, and when the video display device is operated to display video images captured by the rearward viewing camera, visible light emitted by the video display device passes through the mirror reflective element for viewing of displayed video images by a driver of the vehicle viewing the mirror reflective element. When the video display device is operated to display video images captured by the rearward viewing camera, and responsive to determination that a portion of the captured video images include a glare light source, intensity of the visible light emitted by the video display device is reduced to increase visibility of at least portions of the displayed video images that do not include the glare light source.

These and other objects, advantages, purposes and features of the present invention will become apparent upon review of the following specification in conjunction with the drawings.

BRIEF DESCRIPTION OF THE DRAWINGS

FIGS. 8-11 are views of the toggle of the interior rearview mirror assembly of FIG. 7;

FIG. 15 is a diagram of the prismatic mirror reflective element and video display screen of the interior rearview mirror assembly of FIG. 7 adjusted to the daytime mode;

FIG. 16 is a diagram of the prismatic mirror reflective element and video display screen of the interior rearview mirror assembly of FIG. 7 adjusted to the nighttime mode;

FIG. 17 is a diagram of the prismatic mirror reflective element and video display screen of the interior rearview mirror assembly of FIG. 7 adjusted to the digital display mode;

FIGS. 23-25 show the three-position toggle mechanism of FIG. 22 as the mirror is adjusted between the daytime mode, the nighttime mode and the digital display mode;

FIGS. 26-28 show the three-position toggle mechanism of FIG. 22 relative to the mounting structure as the mirror is adjusted between the daytime mode, the nighttime mode and the digital display mode;

FIGS. 35-37 are perspective views of the mounting structure and three-position toggle mechanism of FIG. 22 as the mirror is adjusted between the daytime mode, the nighttime mode and the digital display mode; and FIGS. 38-40 are perspective views of the mounting structure and three-position toggle mechanism of FIG. 22.

DESCRIPTION OF THE PREFERRED EMBODIMENTS

Figure 1:
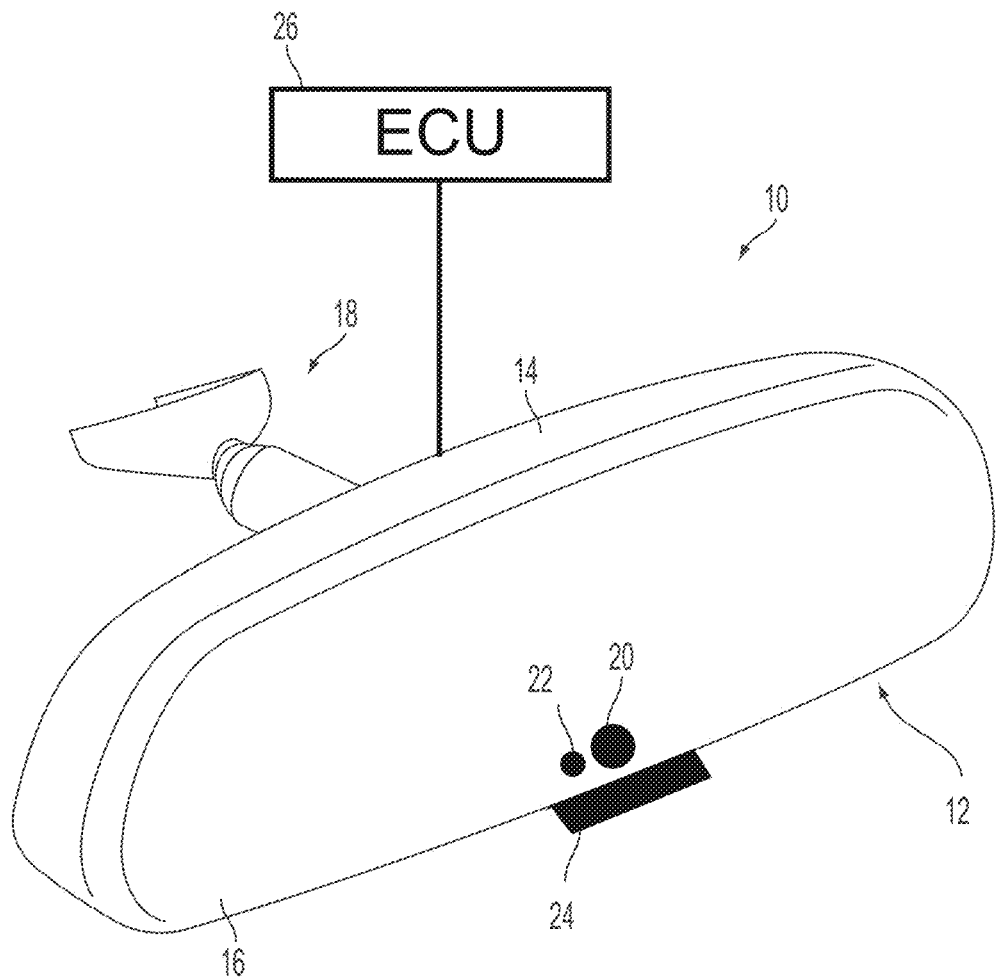
FIG. 1 is a perspective view of an interior rearview mirror assembly.
Figure 2:
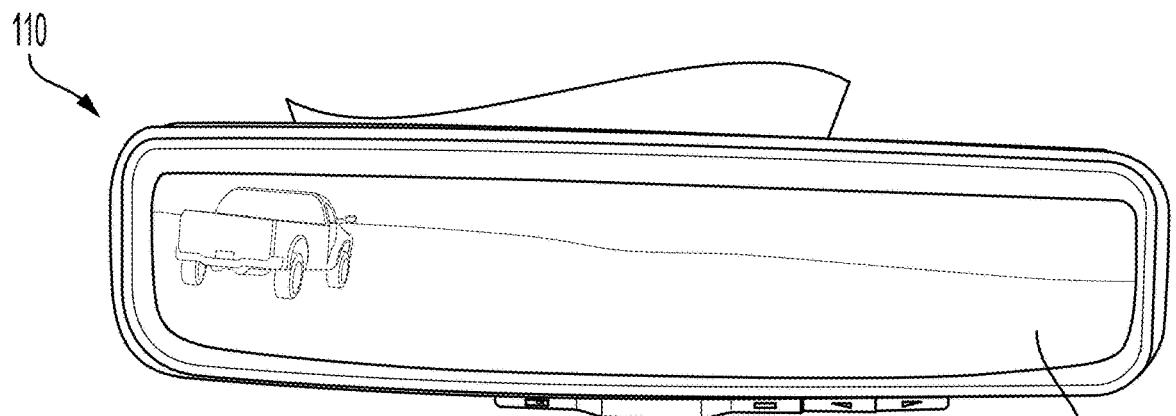
FIGS. 2-5 are views of an interior rearview mirror assembly having a video display screen disposed behind a prismatic mirror reflective element.
Figure 3:
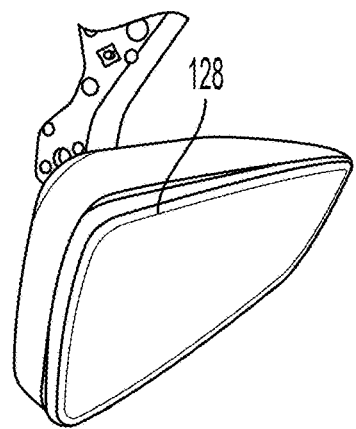
Figure 4:
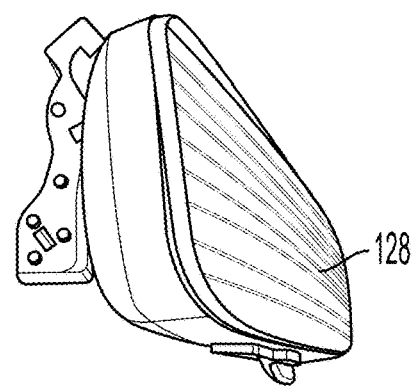
Figure 5:
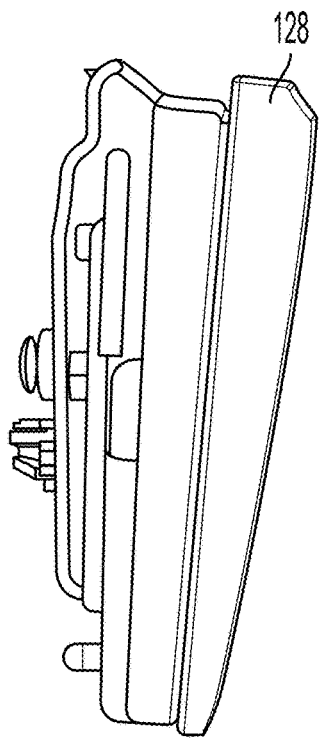
Figure 6:
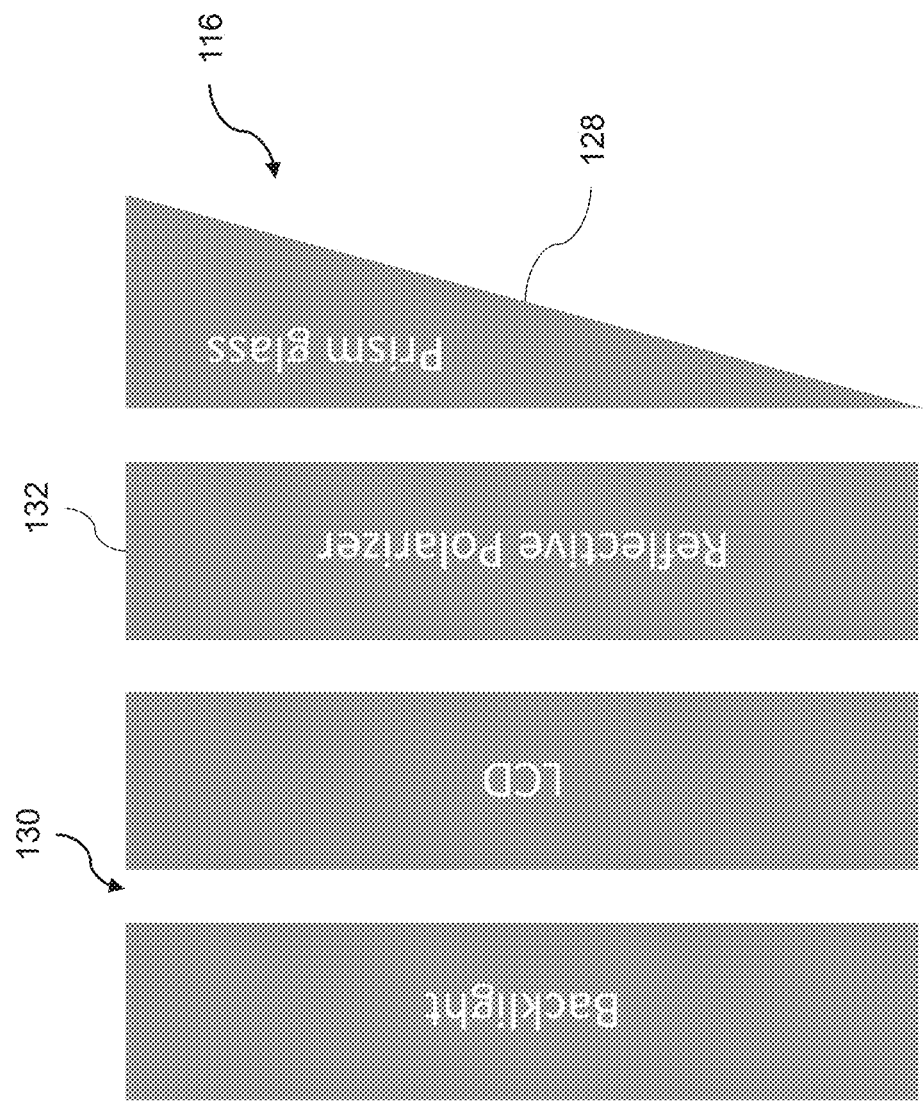
FIG. 6 is a diagram of the prismatic mirror reflective element and video display screen of the interior rearview mirror assembly of FIGS. 2-5.
Figure 7:
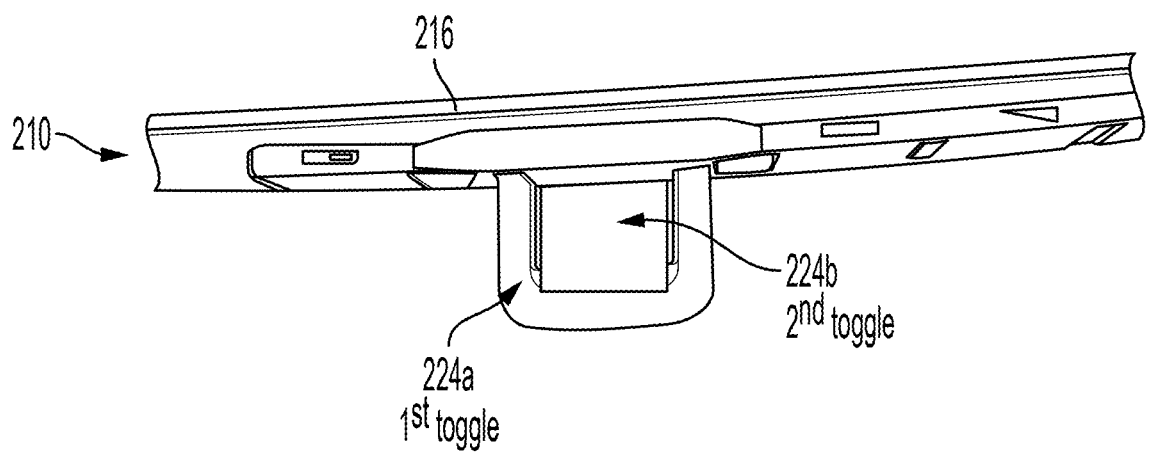
FIG. 7 is a perspective view of another interior rearview mirror assembly having a video display screen disposed behind a prismatic mirror reflective element and a toggle for switching the mirror between a daytime mode, a nighttime mode and between a mirror mode and a digital display mode.
Figure 8:
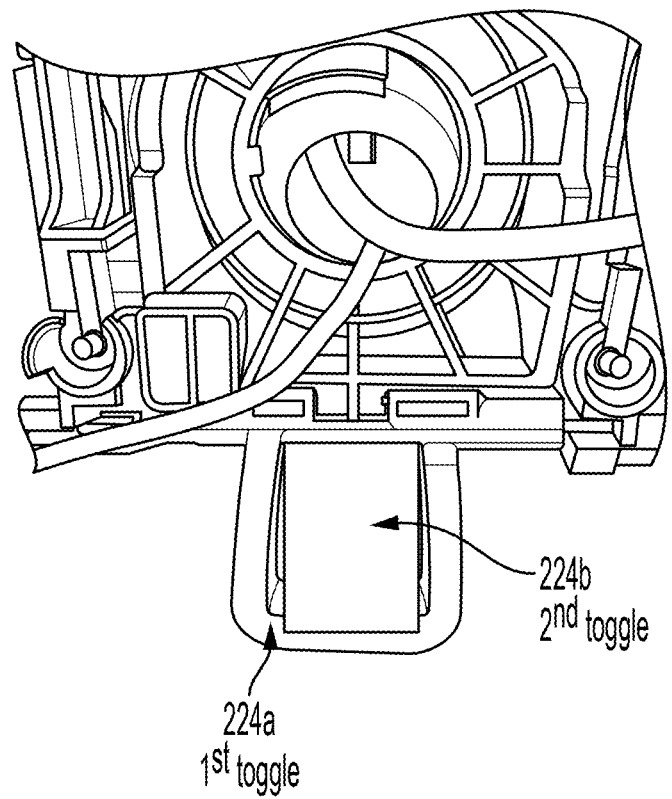
Figures 12, 13:
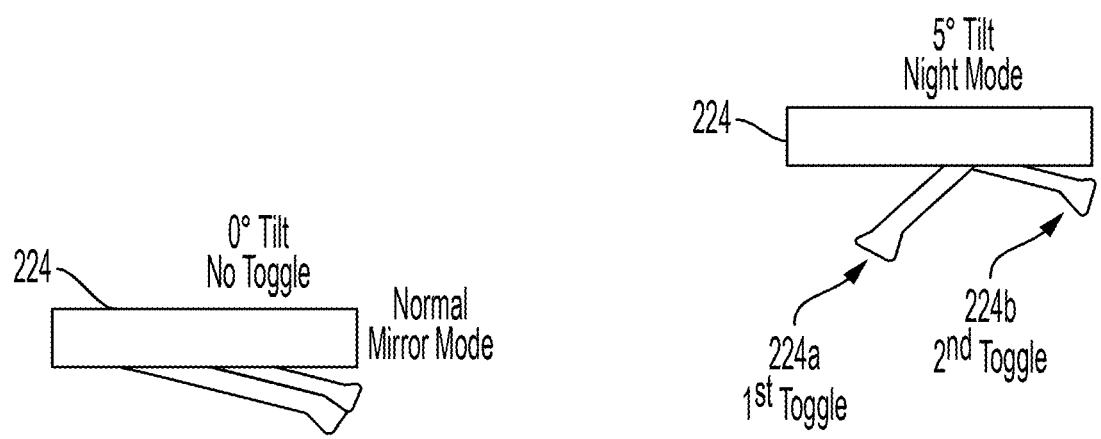
FIG. 12 is a view of the toggle adjusted so that the mirror is in the mirror mode and the daytime mode.
FIG. 13 is a view of the toggle adjusted so that the mirror is in the mirror mode and the nighttime mode.
Figure 14:
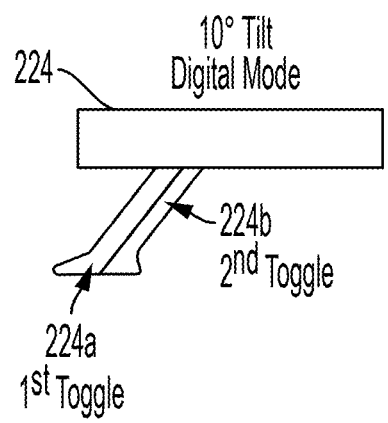
FIG. 14 is a view of the toggle adjusted so that the mirror is in the digital display mode.

Referring now to the drawings and the illustrative embodiments depicted therein, an interior rearview mirror assembly 10 for a vehicle includes a mirror head 12 including a casing 14 and a reflective element 16 positioned at a front portion of the casing 14 (FIG. 1). In the illustrated example, the mirror assembly 10 is configured to be adjustably mounted to an interior portion of a cabin of a vehicle (such as to an interior or in-cabin surface of a vehicle windshield or a headliner of a vehicle or the like) via a mounting structure or mounting configuration or assembly 18. The mirror reflective element may include a variable reflectance mirror reflective element that varies its reflectance responsive to electrical current applied to conductive coatings or layers of the reflective element.

The mirror assembly may include or be associated with a driver monitoring system (DMS), with the mirror assembly including a driver/occupant monitoring camera 20 disposed at a back plate (and viewing through an aperture of the back plate) behind the reflective element 16 and viewing through the reflective element 16 toward at least a head region of the driver of the vehicle. The DMS may include a near infrared light emitter 22 disposed at the back plate and emitting light through another aperture of the back plate and through the reflective element 16. Optionally, the mirror assembly includes a plurality of infrared light emitters and/or a plurality of cameras viewing through the mirror reflective element 16 and capturing image data representative of different respective fields of view of the cabin of the vehicle, such as for monitoring a front passenger seat position and/or for monitoring one or more rear seat positions of the vehicle. That is, the mirror assembly may include a plurality of cameras, where each camera of the plurality of cameras may be disposed at a respective aperture formed through the back plate and view through the mirror reflective element and the mirror assembly may include a plurality of light emitters, where each light emitter of the plurality of light emitters may be disposed at a respective aperture formed through the back plate and emit light through the mirror reflective element. The one or more cameras and the one or more near infrared light emitters move together and in tandem with the mirror head when the mirror head is adjusted relative to the mounting base to set the rearward view of the driver provided by the mirror reflective element.

The mirror assembly may include a camera or sensor or light of a driver monitoring system and/or head and face direction and position tracking system and/or eye tracking system and/or gesture recognition system. Such head and face direction and/or position tracking systems and/or eye tracking systems and/or gesture recognition systems may utilize aspects of the systems described in U.S. Pat. Nos. 11,582,425; 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 18/508,351, filed Nov. 14, 2023, which published on May 23, 2024 as U.S. Patent Publication No. US-2024-0168355 and/or U.S. patent application Ser. No. 18/535,183, filed Dec. 11, 2023, which published on Jun. 13, 2024 as U.S. Patent Publication No. US-2024-40190456, and/or International Publication Nos. WO 2023/220222; WO 2023/034956; WO 2022/241423 and/or WO 2022/187805, which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, such as to provide the driver with unique collision mitigation capabilities based on full vehicle environment and driver awareness state. The image processing and detections and determinations may be performed locally within the interior rearview mirror assembly and/or an overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International Publication No. WO 2022/150826, which are all hereby incorporated herein by reference in their entireties.

Furthermore, the interior mirror assembly may include a dual-mode interior rearview video mirror that can switch from a traditional reflection mode to a live-video display mode, such as is by utilizing aspects of the mirror assemblies and systems described in U.S. Pat. Nos. 11,242,008; 11,214,199; 10,442,360; 10,421,404; 10,166,924; 10,046,706 and/or 10,029,614, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. In other words, the mirror head 12 accommodates a video display screen and the video display screen, when the mirror is in a display mode, displays video images derived from image data captured by a rearward viewing camera, such as a rearward camera disposed at a center high-mounted stop lamp (CHMSL) location, and/or image data captured by one or more other cameras at the vehicle, such as side-mounted rearward viewing cameras or the like, such as by utilizing aspects of the display systems described in U.S. Pat. No. 11,242,008, which is hereby incorporated herein by reference in its entirety. The operating mode of the mirror and video display screen may be selected by flipping the mirror head upward or downward, such as via a toggle 24 located at the mirror head or responsive to a user input. When the mirror is operating in the mirror mode, the video display screen is deactivated and rendered covert by the mirror reflective element, and the driver views rearward via reflection of light incident at the mirror reflective element. When the mirror is operating in the display mode, the video display screen is operated to display video images that are viewable through the mirror reflective element by the driver of the vehicle.

The interior rearview mirror assembly may be associated with a control system or electronic control unit (ECU) 26 having electronic circuitry and associated software. For example, the ECU 26 may include a data processor for processing sensor data captured by one or more sensors at the vehicle (e.g., a glare light or ambient light sensor at the vehicle such as accommodated within the rearview mirror assembly) and/or an image data processor for processing image data captured by the DMS camera, one or more CMS cameras, and the like. Via processing of the image data, the ECU may generate the video images for display at the video display device at the mirror assembly. The ECU 26 may be accommodated by electronic circuitry within the mirror head or the ECU may be disposed within the vehicle and remote from the mirror assembly, such as at an overhead console module of the vehicle.

Thus, The ECU may receive image data captured by a plurality of cameras of the vehicle, such as by a plurality of surround view system (SVS) cameras and a plurality of camera monitoring system (CMS) cameras and optionally the one or more driver monitoring system (DMS) cameras. The ECU may comprise a central or single ECU that processes image data captured by the cameras for a plurality of driving assist functions and may provide display of different video images to a video display screen in the vehicle (such as at the interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2021-0155167 and/or US-2019-0118717, and/or International Publication No. WO 2022/150826, which are all hereby incorporated herein by reference in their entireties.

Typically, a brightness or intensity of the video display screen at the rearview mirror is adjusted based on processing of sensor data captured by an ambient light sensor at the mirror head and facing forward of the vehicle (i.e., the light sensor is at the back of the mirror head and faces the in-cabin surface of the vehicle windshield). However, forward facing light sensors on the interior rearview mirror assembly may have issues with forward light blockage from other sensors and/or housings disposed at or near the windshield, such as overhead console modules attached at the in-cabin surface of the windshield or a headliner of the vehicle. Further, forward facing light sensors can only collect light from in front of the vehicle and thus can cause false or unnecessary increases in the brightness of the backlit display (such as due to headlights, streetlights, and other stray light sources that cause the forward facing light sensor to detect ambient light levels at the vehicle that are not representative of actual ambient light levels). When the brightness of the display is increased more than necessary, the displayed image can appear washed out. For example, in low-light conditions, the current method of using forward-facing light sensors to adjust the brightness of the display produces a gray tone image on the LCD instead of what should be a black portion of the image. Furthermore, typically the backlight is controlled as a singular light source, where the one or more light sources that backlight the display are operated at the same intensity regardless of the image being displayed. In other words, the brightness of all portions of the video images at the display screen may be substantially uniform across the span of the display screen.

As discussed further below, when the mirror 10 is operating in the display mode, the control system adjusts brightness of the interior rearview mirror display screen based on the captured image data and/or the image being displayed. For example, when displaying video images generated based on images captured by a rearward viewing camera of the vehicle, the system may adjust brightness of the rearview mirror display screen based on the image data captured by the rearward viewing camera or by the image data captured by another camera at the vehicle (e.g., the DMS camera, a backup camera, and the like). That is, the system may determine a level of light present at the vehicle based on the captured image data and adjust brightness of the display accordingly.

In other words, the brightness of the display may be adjusted based on the images being captured and displayed instead of solely based on the ambient light levels at the mirror assembly. For example, in night or low-light conditions, the captured image data may have a relatively low light level or intensity while the ambient light level at the mirror head may be relatively higher (such as due to other vehicle's headlights, streetlights, light sources within the vehicle cabin and the like). The brightness of the display and the video images may thus be based on the level of light of the captured images instead of solely based on the ambient light level at the mirror head.

Put another way, operation of the liquid crystal display (LCD) backlight of the display screen (or other suitable type of display screen) may be adjusted based on intensity of light received in the camera's field of view and the image displayed on the mirror's display screen. Using image data provides a more direct and accurate measurement of the lighting conditions in the vehicle's environment. This allows for more precise and targeted adjustments to the backlight, resulting in a clearer, more accurate representation of the displayed image. By reducing the display's intensity or brightness, the "true black" of the image can be increased, resulting in improved contrast and overall image quality.

Furthermore, when generating video images for display at the video display screen, the system may adjust gain of the captured image data to adjust brightness and improve visibility and clarity of the video images. For example, the brightness or gain of the images may be adjusted based on sensor data captured by the ambient light sensor of the vehicle, where an increase in brightness at the cabin of the vehicle may result in a reduction in the gain of the images or the intensity of the display backlight. Optionally, other vehicle data, such as speed and location, may be used to adjust the backlight of the display screen according to a current driving condition of the vehicle. For example, when the vehicle is involved in highway driving, the display screen may be adjusted differently than when the vehicle is involved in city driving (e.g., the display screen may be brighter during city driving than highway driving).

In other words, this method can incorporate ambient light sensors and vehicle data as additional data points to adjust the camera data's gain. For example, if the ambient light is particularly bright, the camera data can be adjusted to reduce the backlight's intensity, preventing the image from being washed out. Similarly, vehicle data, such as speed and location, can be used to more accurately adjust the backlight based on the specific driving conditions, such as highway or city driving.

Furthermore, the system may adjust control of individual light sources or regions of light sources of the display screen independently from other light sources or regions of light sources. That is, the plurality of light emitting diodes (LEDs) or microLEDs or organic light emitting diodes (OLEDs) that, when electrically operated, emit light to provide the display screen may be operated independently of one another or in groups to provide adjustable brightness at different regions or portions of the display screen.

For example, the system may adjust the intensity or brightness of different portions of the display screen based on the image being displayed at the display screen. During night time or low-light condition driving, if a portion of the displayed image is black or dark compared to the rest of the image (e.g., a rearview image with an obstacle illuminated at one portion of the image and darkness at other portions of the image), the portion of the display that corresponds to the illuminated portion of the image can be displayed brighter than the dark portion of the display. In some examples, the intensity of portions of the displayed video images corresponding to glare light sources are reduced and intensity of other portions of the displayed video images that do not correspond to glare light sources are not reduced. This may allow the glare light source and regions of the displayed video images adjacent to the glare light source to be more visible to the driver of the vehicle.

Moreover, the system may adjust the brightness of portions of the display screen based on detection of objects in the video images being displayed. In other words, based on detection of an object present in the field of view of the camera (e.g., another vehicle, an obstacle, a pedestrian and the like), the system may adjust operation of the display screen to increase the brightness of the portion of the displayed video images that correspond to the detected object, and/or the system may decrease the brightness of portions of the displayed video images that do not correspond to the detected object. Thus, the detected object may be more noticeable or discernible or easier to detect for the driver viewing the video images at the mirror assembly.

Optionally, the system may adjust the intensity or brightness of different portions of the display based on light incident at the display. For example, the driver monitoring camera may be disposed at the rearview mirror assembly, such as behind the mirror reflective element, and the system may determine a level and/or position of light incident at the mirror reflective element and display screen based on processing of image data captured by the driver monitoring camera. Thus, if a portion of the display screen has a greater intensity of light incident there at (such as from a street light), the system may adjust brightness of that portion of the display screen separately from the rest of the display screen.

When the system is operating in a standard or mirror mode (i.e., the display screen is not operating to display video images), a portion of the display screen may be illuminated to provide an alert or message to the driver without activating the rest of the display screen. For example, a corner region or edge region of the display screen may be illuminated to display an alert icon or to provide a compass indicator or temperature indicator, and the like.

In other words, the system controls the brightness of different portions or regions of the video display screen based on light incident at the screen and/or the image being displayed at the screen via control of the LCD backlight LEDs and OLEDs of the video mirror, inside CMS, outside CMS, such as during night or other lighting conditions. Based on camera data, the system may determine where on the screen the light exists and independently control the backlight LEDs based on the determined location of the light. Moreover, if the system determines there is a bright object on the left side of the image and the rest of the image is black, then the display may control the LEDs of the backlight accordingly by increasing the brightness of the LEDs on the side of the display where the bright object is located in the image and decreasing the intensity of the LEDs on the side of the display where there is no discernable image. The system may also control operation of OLEDs to more precisely illuminate the individual OLEDs for the particular image being displayed, such as menu options, alerts, headlights, and the like. The system may also illuminate only portions of the screen for alerts or driver information while the mirror is in "mirror mode" without disrupting the mirror's reflectivity in "standard mirror mode." Individually controlling light sources or groups of light sources may improve the quality of the displayed image via contrast and "true black."

The system may determine glare light or higher intensity light sources via processing of image data captured by the rearward viewing camera (e.g., the rear backup camera) or captured by the driver monitoring or cabin monitoring camera or other camera that views at least rearward of the vehicle. The system may utilize aspects of the systems described in U.S. Pat. Nos. 11,242,008; 10,967,796 and/or 10,948,798, and/or International Publication No. WO 2022/150826, which are all hereby incorporated herein by reference in their entireties.

Optionally, the mirror reflective element may include a prismatic glass substrate, which may provide a more clear view of the video display screen through the prismatic mirror reflective element and which may allow the light sources of the video display screen backlight to be driven at a lower intensity. For example, and with reference to FIGS. 2-6, the interior rearview mirror assembly 110 may include a prismatic mirror reflective element having an outer prismatic glass substrate 128 with a video display screen 130 disposed behind the prismatic glass substrate 128 and operable to display video images viewable through the mirror reflective element 116 when the mirror is operating in a display mode. When the mirror is not operating in the display mode, the display screen 130 is not operated or illuminated and the mirror reflector of the prismatic mirror reflective element 116 reflects light incident thereat to provide the rearview to the driver of the vehicle. The mirror reflector of the mirror reflective element 116 uses a reflective polarizer 132 to achieve reflectivity of the mirror.

The polarizer 132 allows polarized light of the display screen 130 to pass through the mirror reflective element when the backlight is on and the display is being operated so that the driver may view the images at the display screen 130. When the display is not being operated, the polarizer 132 blocks or attenuates non-polarized light, thus hiding or rendering the display screen 130 at least partially covert behind the reflective polarizer 132.

Thus, a prismatic mirror reflective element may be used with a video display screen instead of using an electrochromic mirror reflective element with the video display screen. The prismatic mirror reflective element may achieve greater reflectivity than electrochromic glass, such as 50 percent or more reflectivity, 55 percent or more reflectivity, 58 percent or more reflectivity, and the like. Electrochromic glass may reduce light transmission significantly. Further, a prismatic mirror reflective element may reduce thermal load on the display screen and mirror head as the light sources or LEDs of the display screen do not need to be operated at as high of intensities to meet system requirements of display intensity. Thus, the prismatic mirror reflective element may produce a higher quality image on the display screen and reduce cost for the interior rearview mirror assembly by eliminating the need for the electrochromic cell, light sensors for the electrochromic mirror and the associated circuitry, as well as reducing the number of LEDs needed for the display screen.

Optionally, the rearview mirror assembly having the prismatic mirror reflective element includes a toggle mechanism to allow a user to manually adjust the mirror assembly between display modes. For example, and referring to FIGS. 7-17, an interior rearview mirror assembly 210 may include a toggle 224 for adjusting the mirror between a mirror mode or daytime mode (FIG. 15), a nighttime mode (FIG. 16), and a display or digital mode (FIG. 17). In the daytime mode, the prismatic glass 228 and polarizer 232 are in a first orientation or position, the display screen 230 is not being operated to display images, and the mirror reflector of the mirror reflective element 216 provides the rearview to the driver of the vehicle. In the nighttime mode, the glass 228 and polarizer 232 are tilted or pivoted upward, such as five degrees from the daytime mode, to provide a nighttime or dimmed rearward view to the driver of the vehicle (whereby the front glass surface of the wedge-shaped glass substrate reflects light incident thereat to provide the rearward view to the driver). In the digital mode orientation, the glass 228 and polarizer 232 are tilted further upward beyond the nighttime mode orientation, such as up to around ten degrees from the daytime mode (e.g., 5 degrees more than at the nighttime mode), to improve clarity and brightness of images displayed by the display screen 230 through the glass 228 and polarizer 232 for viewing by the driver of the vehicle. The display screen may be operated in any mode of the mirror, but may be best seen when the mirror is in the digital mode and tilted further upward.

As shown in FIGS. 7-14, the toggle 224 includes a first toggle 224a that is pivotable relative to the mirror head to move the mirror between the daytime mode and the nighttime mode. That is, the first toggle 224a is pivotable between a first position (FIG. 12) and a second position (FIG. 13) to move the mirror between the daytime mode and the nighttime mode. A second toggle 224b is also pivotable relative to the mirror head between a first position (FIG. 12) and a second position (FIG. 14) to move the mirror between the daytime mode or nighttime mode and the digital mode. With the first toggle 224a in the second position and the mirror in the nighttime mode, the second toggle 224b is movable from its first position to its second position to move the mirror to the digital mode. Optionally, with the first toggle 224a and the second toggle 224b both in their respective first positions, the second toggle 224b may be movable to the second position to move the mirror from the daytime mode to the digital mode. When both toggles are in the first position and the second toggle 224b is moved to the second position, the first toggle 224a may move with the second toggle 224b to the second position. Similarly, the toggles may be movable together back to the first position. As shown in FIGS. 9-11, the first toggle 224a may at least partially overlap the second toggle 224b and be separable from the second toggle 224a to pivot separately from the second toggle relative to the mirror head.

In other words, the interior rearview mirror assembly 210 includes a three position toggle. The first position provides typical five degrees of tilt to produce first surface reflections when the backlight is turned on the five degree position. With an additional tilt, such as five degrees, beyond the first position (for a total of ten degrees of tilt from the daytime mode), this eliminates most or all of the first surface reflections, allowing for a clearer image than if the second additional tilt did not occur. This may be achieved with a split toggle design, where the first toggle 224a tilts the mirror to the nighttime mode. The second toggle 224b tilts the mirror the additional five degrees to the digital mode. When tilting the toggles back to the daytime mode, both the first toggle 224a and the second toggle 224b may tilt together. Optionally, the mirror may have a dual toggle mechanism, whereby a first toggle or tab toggles the mirror between the daytime mirror mode and the nighttime mirror mode, and the second toggle or tab is movable to select the digital display mode while the mirror head is in the daytime orientation or mode. In such a configuration, the second toggle may have its initial position in an orientation that corresponds with the nighttime mode orientation of the first toggle.

Figure 18:
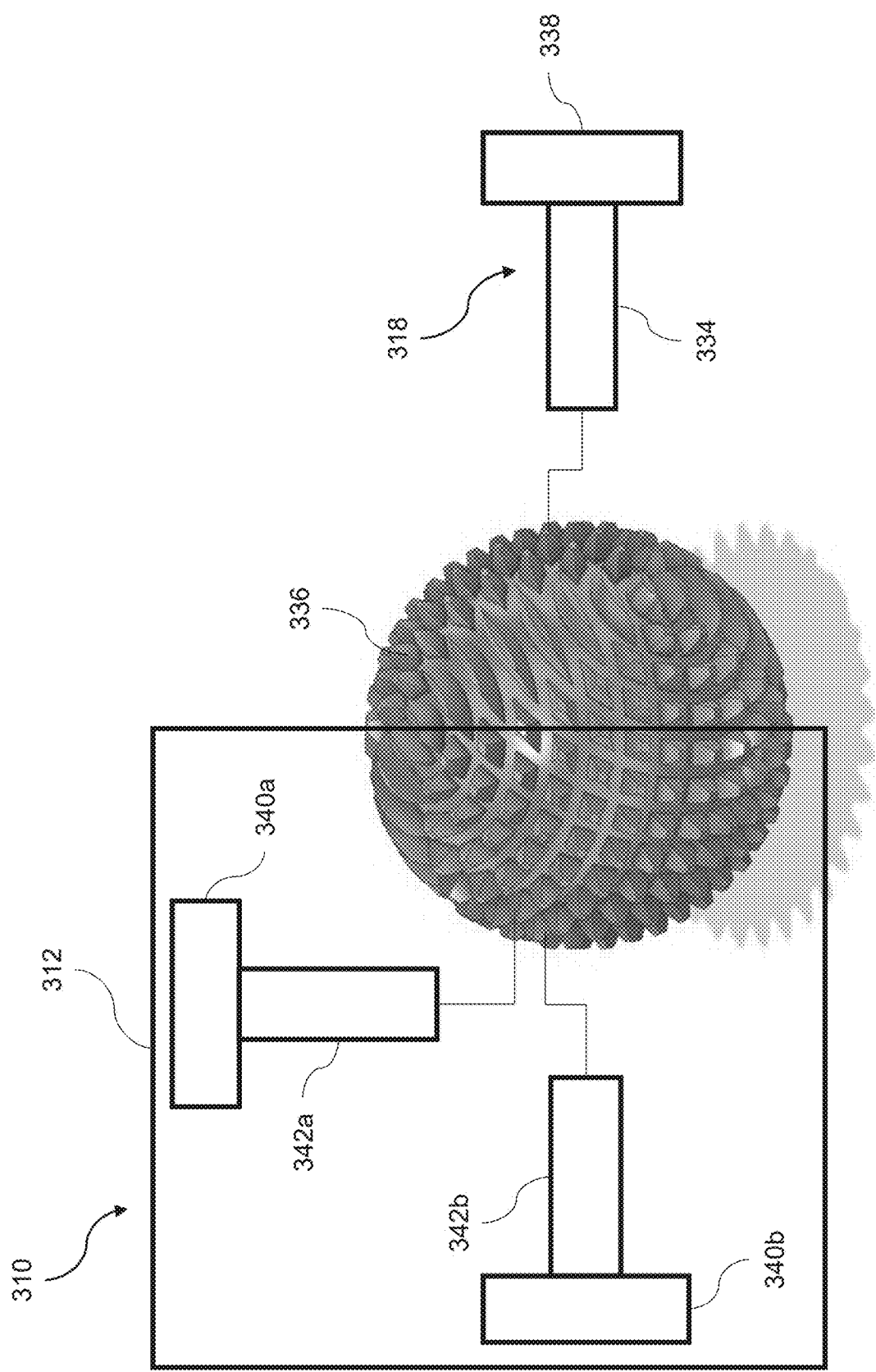
FIG. 18 is a diagram of another interior rearview mirror assembly with an actuator having a spherical gear element for adjusting a position of the mirror head relative to the mounting structure.

In some examples, the mirror assembly includes an actuator for adjusting position of the mirror head relative to the mounting base. For example, and with reference to FIG. 18, the interior rearview mirror assembly 310 may include an active ball mechanism mirror actuator and stay, where the mounting structure 318 of the mirror assembly includes a mounting arm 334 attached or coupled to a spherical gear element 336. The spherical gear element 336 is disposed at the rear of the mirror head 312, such as at least partially received in a socket at the backplate or rear surface of the mirror casing, and the mounting arm 334 extends between the spherical gear element 336 and a mounting button or stay 338 that is attached at the in-cabin surface of the vehicle (e.g., the in-cabin surface of the vehicle windshield).

One or more electrically operable motors are accommodated within the mirror head 312 and, when electrically operated to adjust a position of the mirror head 312 relative to the mounting button 338, drive one or more gear elements or gear trains connected between the spherical gear element 336 and the motors. For example, a first motor 340a may drive a first gear train 342a to pivot or rotate the spherical gear element 336 along a first pivot axis (e.g., a vertical pivot axis) and a second motor 340b may drive a second gear train 342b to pivot or rotate the spherical gear element 336 along a second pivot axis (e.g., a horizontal pivot axis). As the spherical gear element 336 moves along the first and second pivot axes, the mounting arm 334 moves relative to the mounting button 338 to adjust the position of the mirror head. In other words, the spherical gear element 336 may be constrained relative to the mirror head 312 so that, as the motors are operated to drive the spherical gear element 336, the spherical gear element 336 and the mounting arm 334 move to adjust the position of the mirror head.

Optionally, the spherical gear element may be fixed relative to the mounting arm so that, as the motors are operated, the gear trains engage the spherical gear element to move the mirror head about the spherical gear element. That is, the mirror head may travel about the outer surface of the spherical gear element to adjust the position of the mirror head.

In some examples, the electrically operable motors may be accommodated by the mounting structure of the mirror assembly. The spherical gear element may be fixed relative to the mirror head so that, during operation of the motors, the gear trains engage the spherical gear element and travel about the spherical gear element to adjust the position of the mirror head relative to the mounting arm.

The mirror position may be adjusted in response to a user input, such as an input at the infotainment screen, an input at the mirror head or overhead console, and the like. Optionally, the position of the mirror head may be adjusted in response to control from the driver monitoring system, such as to position the mirror head based on a view of the DMS camera accommodated by the mirror head and viewing the driver of the vehicle. That is, the mirror head may be adjusted to provide an optimal view of the driver of the vehicle. Optionally, the mirror head may be adjusted based on detected glare light at the surface of the mirror reflective element to reduce the effect of the glare light on the visibility of the video images displayed at the mirror head.

Thus, the mirror assembly includes the spherical gear element and mirror actuator to allow the mirror position to be controlled electrically in vertical or up and down positions and horizontal or left and right positions. The mirror position may be controlled manually, such as via user input at the center stack or infotainment system, the overhead console, and the like. Optionally, the mirror may be controlled automatically, such as via the driver monitoring system to provide an optimal mirror position based on the driver position. Further, the mirror may use camera data, ambient light sensors and the like to determine glare at the mirror screen and automatically move the mirror to reduce glare to the driver. One or more motors and/or gears may be inside the mirror and rotate the mirror head about the gear. Only a portion of the spherical gear element may be geared.

Although described herein as suitable for interior rearview mirror assemblies, it should be understood that exterior rearview mirror assemblies may be suitable for use with the spherical gear element and mirror actuator to provide more precise and greater range of motion of the exterior mirror head.

Optionally, the mirror assembly includes a three position toggle mechanism for adjusting the prismatic mirror assembly between a daytime mode, a nighttime mode, and a video display more. For example, and referring to FIGS. 19-40, an interior rearview mirror assembly 410 includes a prismatic mirror reflective element having an outer prismatic glass substrate 428 and a video display screen 430 disposed behind the prismatic glass substrate 428 and operable to display video images viewable through the mirror reflective element (and through the transflective mirror reflector disposed at the second or rear surface of the prismatic, wedge-shaped glass substrate) when the mirror is operating in a display mode. When the mirror is not operating in the display mode, the display screen is not operated or illuminated and the mirror reflector of the prismatic mirror reflective element reflects light incident thereat to provide the rearview to the driver of the vehicle. The prismatic glass substrate 428 (together with the mirror head) is pivotable or tiltable (e.g., about a lateral axis extending along a width of the glass substrate) relative to mounting structure 418 of the interior rearview mirror assembly and the mirror assembly includes a three-position toggle assembly 424 for tilting the prismatic glass substrate 428 to adjust the mirror between a mirror mode or daytime mode (FIG. 19), a nighttime mode (FIG. 20) and the display or digital mode (FIG. 21).

Figure 19:
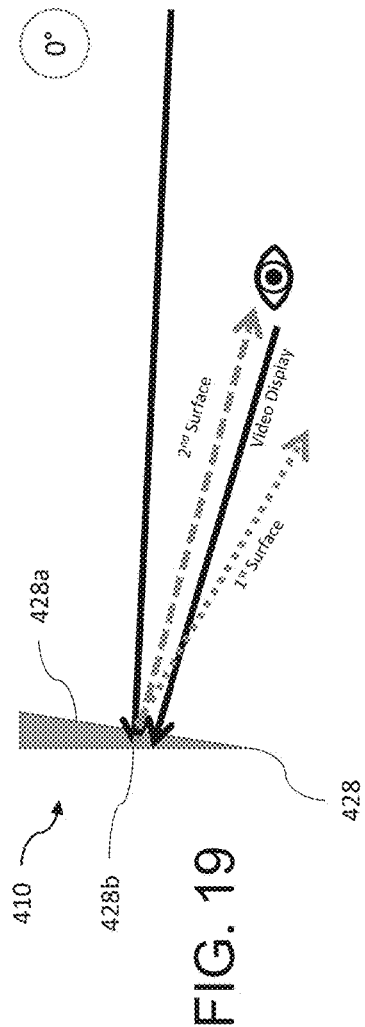
FIG. 19 is a diagram of the prismatic mirror reflective element of FIG. 7 adjusted to the daytime mode.
Figure 20:
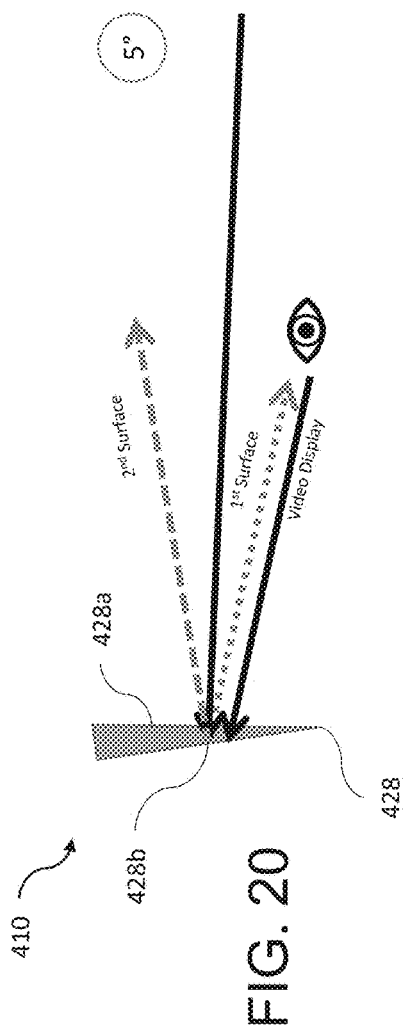
FIG. 20 is a diagram of the prismatic mirror reflective element of FIG. 7 adjusted to the nighttime mode.
Figure 21:
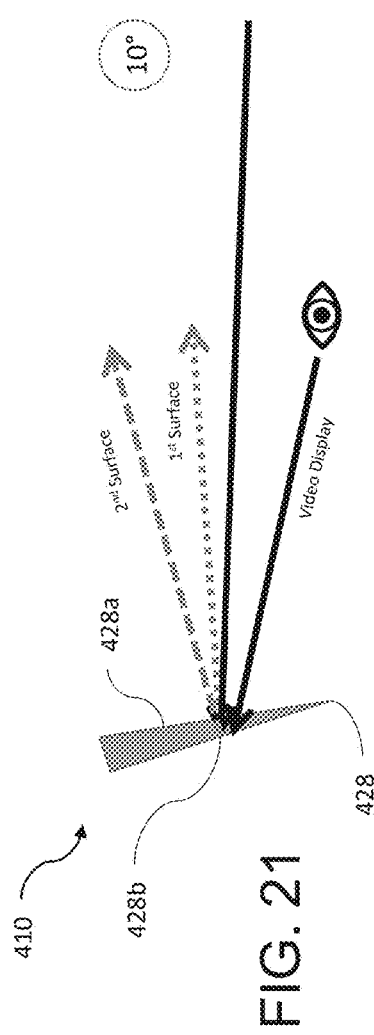
FIG. 21 is a diagram of the prismatic mirror reflective element of FIG. 7 adjusted to the digital display mode.

As shown in FIGS. 19-21, as the mirror is adjusted between the daytime mode, the nighttime mode and the display mode, the prismatic glass substrate 428 may be tilted or pivoted relative to the mounting structure 418 to adjust a viewing angle of the driver viewing a front or first surface 428a of the prismatic glass substrate 428 and a rear or second surface 428b of the glass substrate 428 (which may include the mirror reflector). The front surface 428a and the rear surface 428b are at opposing sides of the prismatic glass substrate 428 and are angled relative to one another. The driver may be able to view images displayed at the video display screen when the prismatic glass substrate 428 is adjusted to any of the daytime mode, the nighttime mode and the display mode.

When the mirror is adjusted to the daytime mode, the prismatic glass substrate 428 is oriented so brighter reflections from the mirror reflector at the rear surface 428b of the prismatic glass substrate 428 are directed toward the driver (when the mirror head is adjusted to set the driver's rearward view) and dimmer reflections from the front surface 428a are directed downward away from the view of the driver. When the mirror is adjusted from the daytime mode to the nighttime mode, the prismatic glass substrate 428 is pivoted or tilted upward (e.g., five degrees). Thus, when the mirror is adjusted to the nighttime mode, the prismatic glass substrate 428 is oriented so that the dimmer reflections from the front surface 428a are directed toward the driver and brighter reflections from the rear surface 428b are directed upward away from the view of the driver (thus reducing glare light emanating from trailing vehicles rearward of the equipped vehicle).

The video display screen 430, when operated to emit light through the prismatic glass substrate 428, emits light that passes through the reflective element and is viewable by the driver when the mirror reflective element is in the daytime mode, the nighttime mode and the display mode. However, when the mirror is adjusted to the daytime mode, the reflections from the rear surface 428b of the glass substrate 428 impede the driver's ability to view images displayed at the video display screen. Similarly, when the mirror is adjusted to the nighttime mode, light emitted by the video display screen may be impeded by some reflections from the front surface 428a of the prismatic glass substrate 428.

When the mirror is adjusted to the display mode from the nighttime mode, the prismatic glass substrate 428 is pivoted or tilted further upward from the nighttime mode (e.g., five degrees further, for a total tilt of ten degrees upward from the daytime mode) so that the reflections from the front surface 428a and the reflections from the rear surface 428b of the prismatic glass substrate 428 are directed upward and away from the view of the driver. Thus, with the mirror in the display mode and the video display screen 430 operated to display images, the display screen images are viewable by the driver of the vehicle without reflections from the prismatic glass substrate 428 impeding the driver's view of the displayed images.

In other words, with the prismatic glass substrate 428 pivoted or tilted from the daytime mode to the nighttime mode, second surface reflections to the driver are reduced, but first surface reflections toward the driver still exist. Thus, when the backlight of the video display screen 430 is on or operating with the mirror in the nighttime mode, the first surface reflections impede the driver's ability to view displayed images. An additional five degrees of tilt from the nighttime mode to the display mode (ten degrees total tilt from the daytime mode) directs at least a portion of (such as all of) the first surface reflections toward the headliner or roof or upper portion of the interior cabin of the vehicle, and improves image quality for the driver of the vehicle. Thus, the mirror assembly includes the three-position toggle mechanism 424 operable to adjust the mirror between the daytime mode, the nighttime mode and the display mode so that the prismatic glass substrate 428 may be paired with the video display screen (instead of, for example, an electrochromic cell paired with the video display screen).

Figure 22:
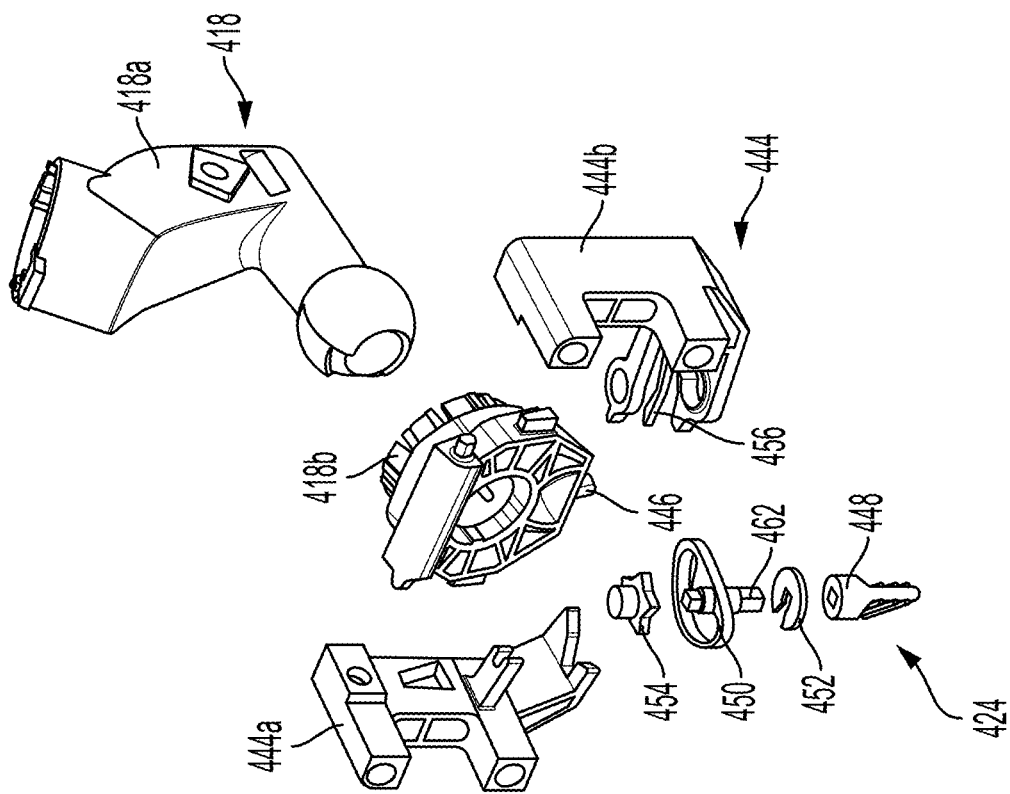
FIG. 22 is an exploded view of mounting structure and a three-position toggle mechanism of another interior rearview mirror assembly.
Figure 29:
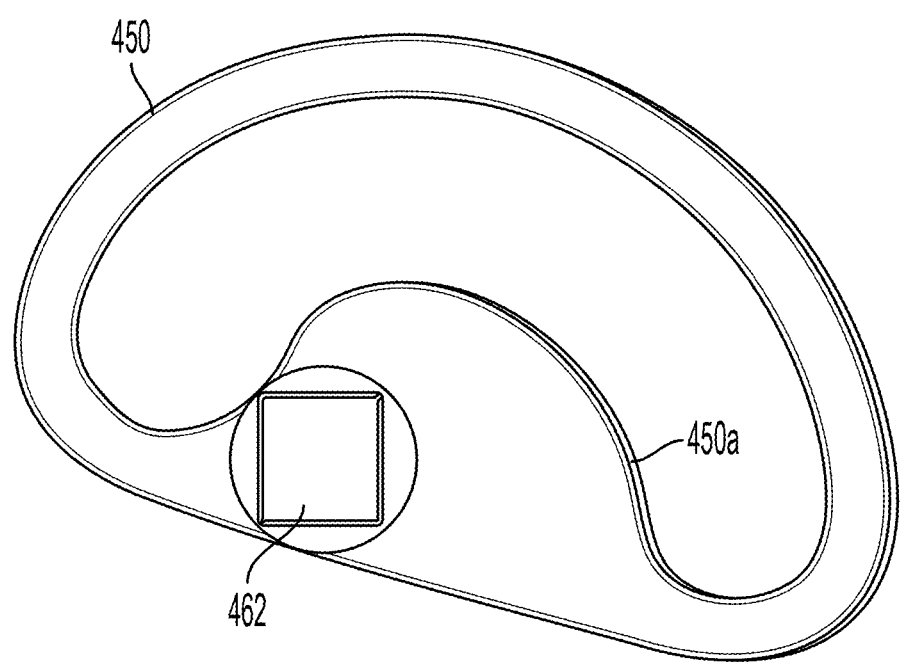
FIG. 29 is a perspective view of an arcuate cam element of the three-position toggle mechanism of FIG. 22.
Figure 30:
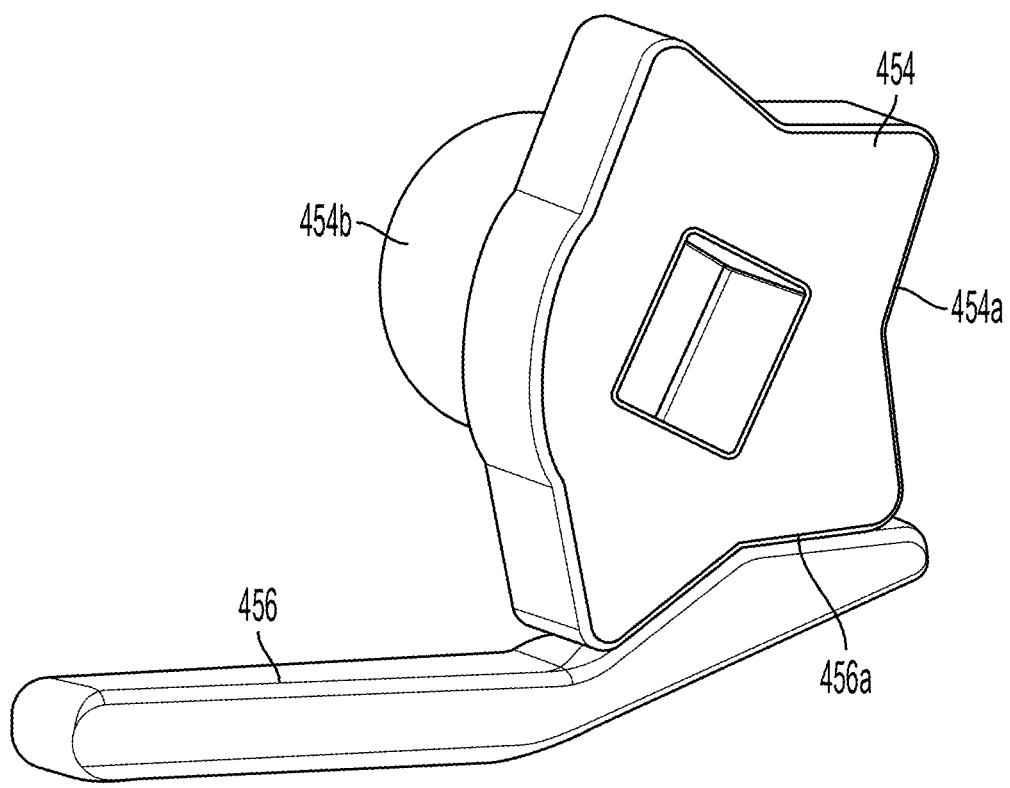
FIG. 30 is a perspective view of a star cam element and spring finger of the three-position toggle mechanism of FIG. 22.
Figure 32:
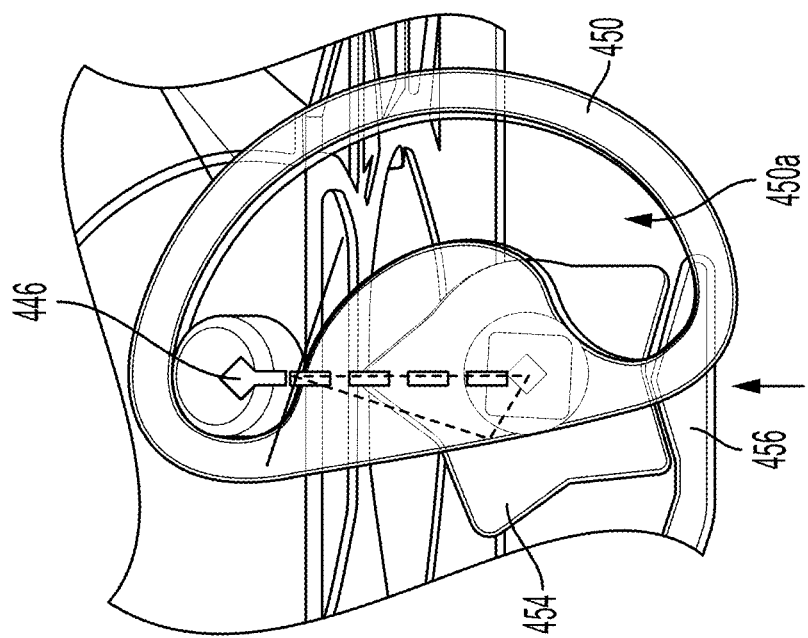
FIGS. 31 and 32 are diagrams showing a torque path for the three-position toggle mechanism of FIG. 22 relative to the mounting structure.
Figure 31:
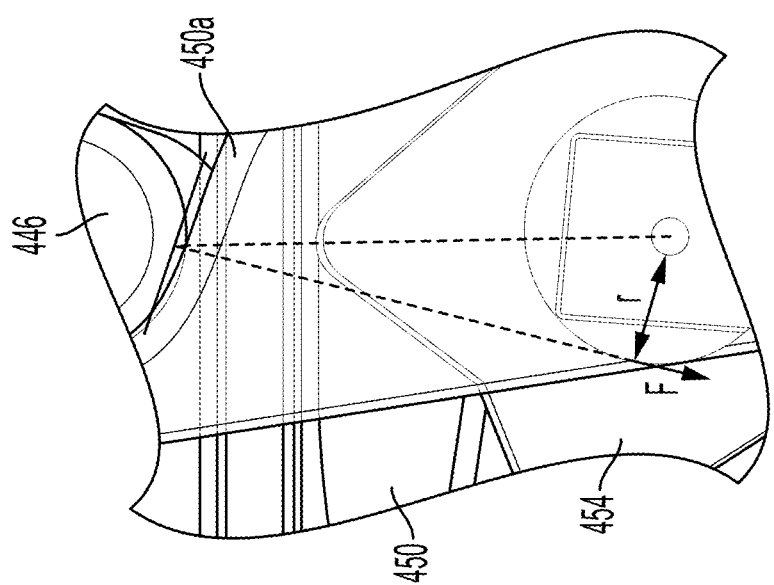
Figure 34:
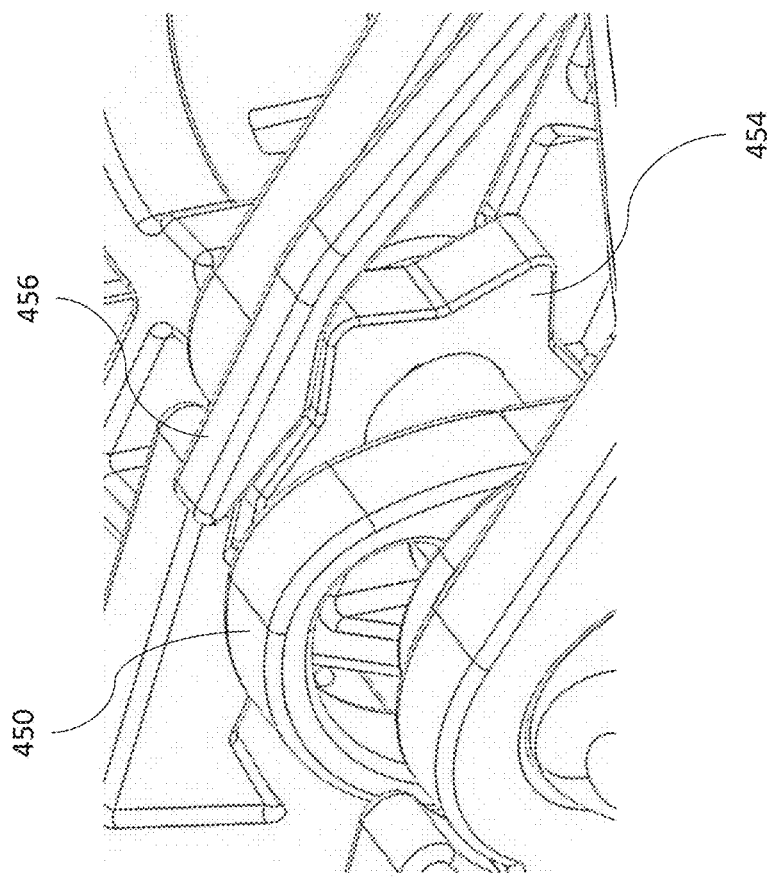
FIG. 34 is an enlarged view of the three-position toggle mechanism of FIG. 22 in a detent position.
Figure 33:
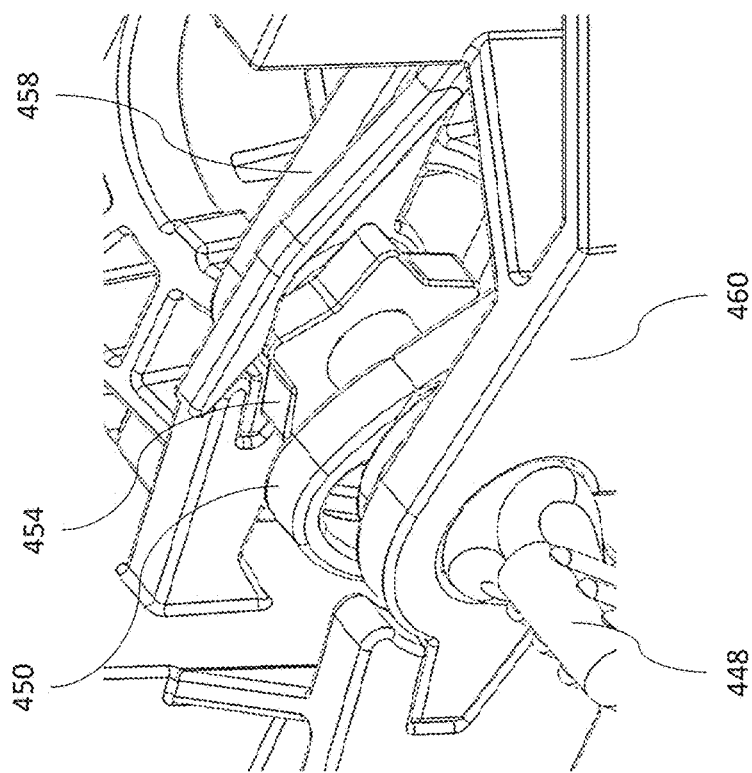
FIG. 33 is an enlarged view of the three-position toggle mechanism of FIG. 22 between detent positions.

As shown in FIGS. 22, the mounting structure 418 of the mirror assembly 410 includes a mirror stay 418a that attaches at the interior surface of the vehicle (e.g., the in-cabin surface of the vehicle windshield or the headliner of the vehicle or the like) and a socket 418b disposed at the mirror head and configured to receive a ball member of the mirror stay 418a to adjustably mount the mirror head relative to the mirror stay 418a. A socket mounting bracket 444 pivotally couples to the mounting structure 418. As discussed further below, the socket mounting bracket 444 receives the three-position toggle mechanism 424 so that the toggle mechanism 424 and the prismatic glass substrate 428 (and the video display screen attached at the rear of the prismatic glass substrate) are pivotable relative to the mounting structure 418. So the mirror reflective element, mirror casing, video display screen, and toggle mechanism can pivot relative to the socket element 418b via actuation of the toggle mechanism, and the mirror reflective element, mirror casing, video display screen, toggle mechanism and socket element can pivot relative to the stay via the driver adjusting his/her rearward view.

For example, the socket mounting bracket 444 may include a first bracket portion 444a and a second bracket portion 444b that join to opposing sides of the socket member 418b and that cooperate to receive the toggle mechanism 424 along a lower portion of the socket mounting bracket 444. The prismatic glass substrate 428 may be coupled to the socket mounting bracket 444 and the toggle mechanism 424 adjusts or tilts the socket mounting bracket relative to the socket member 418b to adjust the mirror between the daytime mode, the nighttime mode and the display mode. The bracket 444 attaches (such as via a plurality of fasteners attaching to the posts protruding from the bracket portions) at a mirror back plate or structure, which may house or support the video mirror display device or screen at the rear of the prismatic glass substrate. The mirror back plate or structure may be adhesively attached at the rear of the mirror reflective element or may be attached at a mirror casing that snap-attaches to the mirror reflective element to attach and support the video display screen at the rear of the mirror reflective element.

The socket member 418b includes a protrusion or cam follower 446 extending from a lower portion of the socket member 418b and the toggle mechanism 424 engages and pivots relative to the cam follower 446 to adjust the position of the prismatic glass substrate 428 relative to the socket member 418b. In other words, the prismatic glass substrate 428 pivots relative to the socket member and the mirror stay together and in tandem with the toggle mechanism 424 so that, as the toggle mechanism 424 engages and pivots relative to the cam follower 446, the prismatic glass substrate 428 is tilted with the toggle mechanism 424.

Put another way, the toggle mechanism 424 is disposed along a lower edge portion of the prismatic glass substrate 428 and engages the cam follower 446 to define a distance between the lower edge portion of the glass substrate and the cam follower 446. As the toggle mechanism 424 is pivoted relative to the cam follower 446 to adjust the mirror from the daytime mode toward the nighttime mode and the display mode, the distance between the toggle mechanism 424 and the cam follower 446 increases to pivot the prismatic glass substrate 428 relative to the socket element and the mounting structure 418.

For example, the toggle mechanism 424 includes a toggle or tab or input element 448 that is at least partially exposed exterior the mirror head for manipulation by a user to adjust the mirror between modes. The input element 448 may include a paddle or switch portion 448a for grasping by the user when pivoting or rotating the input element 448 relative to the mirror head. The input element 448 is pivotally fixed or rotationally fixed relative to an arcuate cam element 450, such as via a snap ring or retaining ring 452 received along a pivot axis of the toggle mechanism 424. The arcuate cam element 450 includes an arcuate channel 450a that receives the cam follower 446 of the socket element 418b.

As the input element 448 is pivoted, the arcuate cam element 450 pivots relative to the cam follower 446 and the cam follower 446 moves along the arcuate channel 450a of the cam element 450. Because the radius of the arcuate channel 450a relative to the pivot axis of the toggle mechanism 424 increases as the toggle mechanism 424 is pivoted from the daytime mode toward the nighttime and display modes, as the cam follower 446 moves along the arcuate channel 450a, the distance between the pivot axis of the toggle mechanism 424 and the cam follower 446 increases to tilt the toggle mechanism 424 and the prismatic glass substrate 428 relative to the mirror stay.

For example, when the mirror is in the daytime mode (FIGS. 23 and 26), the distance between the cam follower 446 in the arcuate channel 450a and the pivot axis of the toggle mechanism 424 is at a minimum and the second surface 428b of the prismatic glass substrate 428 may provide the rearward view to the driver. As the mirror is adjusted from the daytime mode toward the nighttime mode (FIGS. 24 and 27), the cam follower 446 moves along the arcuate channel 450a and the distance between the cam follower 446 and the pivot axis of the toggle mechanism 424 increases to tilt the prismatic glass substrate 428 relative to the mirror stay. As the mirror is further adjusted from the nighttime mode toward the display mode (FIGS. 25 and 28), the cam follower 446 moves further along the arcuate channel 450a to further increase the distance between the cam follower 446 and the pivot axis of the toggle mechanism 424 and further tilt the prismatic glass substrate 428 relative to the mirror stay. When the mirror is adjusted back toward the daytime mode, the cam follower 446 travels back along the arcuate channel 450a to reduce the distance between the cam follower 446 and the pivot axis of the toggle mechanism 424 and tilt the prismatic glass substrate 428 downward relative to the mirror stay.

In other words, the cam follower 446 is always in line with the point of rotation of the tab 448 and the arcuate cam 450. The distance between the cam follower 446 and the point of rotation changes throughout actuation of the toggle mechanism 424 and this causes the mirror to tilt relative to the stay 418.

Further, the arcuate channel 450a may include angled or chamfered walls to accommodate and/or guide tilt of the arcuate cam 450 relative to the cam follower 446 as the arcuate cam 450 pivots about the cam follower 446. Thus, as the prismatic glass substrate 428 is tilted relative to the mounting structure 418, the walls of the arcuate channel 450a where they are engaging the cam follower 446 may be substantially parallel to the pivot axis of the toggle mechanism 424. That is, the arcuate cam 450 is configured to constrain the cam follower 446 in an angled arc and the angle of the path relative to the rotation axis changes to account for the angle of the socket 418b relative to the glass substrate 428. This ensures that there is no free play throughout travel of the arcuate cam 450 relative to the cam follower 446.

A star cam or detent cam 454 of the toggle mechanism 424 engages a spring finger or engagement element 456 coupled to the socket mounting bracket 444 to define detent positions for the toggle mechanism 424 and prismatic glass substrate 428. The star cam 454 is pivotable or rotatable with the tab 448 and the arcuate cam 450 of the toggle mechanism 424 and includes a series of angled recesses or detent interfaces 454a along an outer edge that engages an angled tab or detent 456a of the spring finger 456. As the toggle mechanism 424 is pivoted between the daytime mode, nighttime mode and display mode, the star cam 454 pivots and the spring finger 456 rides along the detent interface 454a of the star cam 454. When the toggle mechanism 424 arrives at the daytime mode (FIG. 23), the nighttime mode (FIG. 24) and the display mode (FIG. 25), the detent interface 454a of the star cam 454 pivots into engagement with the detent 456a of the spring finger 456 to retain the toggle mechanism 424 and the prismatic glass substrate 428 at the respective detent position.

The spring finger 456 extends from the second bracket portion 444b and the angled tab or detent 456a is biased into engagement with the star cam 454. Further, the angled recesses or detents 454a of the star cam 454 correspond to the shape of the detent 456a of the spring finger 456 so that, as the star cam 454 rotates and approaches a detent position, the biasing force from the spring finger 456 may urge the tab 456a along the angled surface of the detent 454a to align a peak of the tab 456a with a valley of the detent 454a and urge the star cam 454 toward and into the detent position. When the user pivots the toggle mechanism 424 to adjust the angle of the prismatic glass substrate, the spring finger 456 rides along the detent 454a to move out of the detent position and into the next detent position.

Thus, the star cam 454 and the spring finger 456 provide three detent positions for the toggle mechanism 424. The spring finger 456 is located on the mounting structure 418 and provides a biasing force and follower for the star cam 454. The star cam 454 and spring finger 456, when engaged in one of the detent positions, hold or secure the glass substrate in one of the daytime mode, the nighttime mode and the display mode to preclude inadvertent shifting of the mirror between modes or detent positions (such as when the user moves the mirror head to adjust the rearward field of view provided by the mirror reflective element). The star cam 454 and spring finger 456 provide resistance against twisting of the tab 448. Further, the star cam 454 self-centers and thus may move the toggle mechanism 424 to one of the detent positions even when the user does not manually move the toggle mechanism 424 fully to the detent position. That is, with the star cam 454 positioned relative to the spring finger 456 between detent positions (FIG. 33), the spring finger 456 may force the star cam 454 over a high point and into the detent position (FIG. 34) to provide a centering mechanism.

Because the geometry of the toggle mechanism 424 provides a short torque arm about the tab 448 (FIGS. 31 and 32), the detent force between the spring finger 456 and the star cam 454 does not need to be high in order to prevent self-flip. In other words, because of the torque relationship between the tab 448 and the cam follower 446 via the arcuate cam 450, a significant force acting on the mirror is needed to translate into rotation of the tab 448 and thus the biasing force between the spring finger 456 and the star cam 454 in the detent position may be relatively low and still preclude the toggle mechanism 424 from inadvertently flipping between detent positions. Optionally, the arcuate channel 450a may include local regions of constant radius which, when the cam follower 446 is engaged in the local region of constant radius, results in little to none of the force acting on the mirror translating into a torque on the tab 448, thus further reducing or eliminating self-flip.

As shown in FIGS. 35-40, the socket mounting bracket 444 is pivotally coupled to the socket member 418b and the toggle mechanism 424 is coupled to the socket mounting bracket 444 so that adjustment of the toggle mechanism 424 moves or pivots the socket mounting bracket 444 relative to the socket member 418b during adjustment of the prismatic glass substrate 428. The first bracket portion 444a and the second bracket portion 444b include arms that, when the bracket portions are joined together, extend between the bracket portions and pivotally receive the toggle mechanism 424. For example, a first or upper arm 458 and a second or lower arm 460 extend between the first bracket portion 444a and the second bracket portion 444b, with the toggle mechanism 424 extending through the lower arm 460 and at least partially through the upper arm 458. The spring finger 456 extends from the second bracket portion 444b between the upper arm 458 and the lower arm 460.

A pivot pin 462, such as a square or rectangular shaft, may be integrally formed with the arcuate cam 450 and extend along the pivot axis of the toggle mechanism 424. The pivot pin 462 is at least partially received by the tab 448 and the star cam 454 to rotationally fix the tab 448, the arcuate cam 450 and the star cam 454 together, with the toggle mechanism 424 collectively pivotable relative to the socket mounting bracket 444. For example, with the toggle mechanism 424 disposed at the socket mounting bracket 444, a cylindrical portion 448b of the tab 448 receives a first end of the pivot pin 462 and a second end of the pivot pin 462 opposite the first end is received by a cylindrical portion 454b of the star cam 454, with the portion of the pivot pin 462 between the first end and the second end extending through the arcuate cam 450. Optionally, the pivot pin 462 may comprise a separate component that is received by the tab 448, the arcuate cam 450 and the star cam 454 to define the pivot axis of the toggle mechanism 424. Thus, when the tab 448 is pivoted by the user, the arcuate cam 450 and the star cam 454 pivot together and in tandem with the tab 448.

With the handle portion 448a of the tab 448 disposed below the lower arm 460, cylindrical portion 448b of the tab 448 extends through the lower arm 460 and is pivotally received by the lower arm. The cylindrical portion 454b of the star cam may be pivotally received by and/or extend through the upper arm 458. The retaining ring 452 may be disposed about the pivot pin 462 at an upper surface of the lower arm 460 and/or an upper surface of the cylindrical portion 448b of the tab 448 to retain the toggle mechanism 424 at the socket mounting bracket 444.

The brackets 444a, 444b are pivotally mounted to the socket element 418b via upper and lower protrusions at each side of the socket element 418b. The upper protrusions or pins are pivotally received in upper apertures or recesses of each bracket 444a, 444b, while the lower protrusions are movably received in lower apertures or recesses of each bracket. When the tab 448 is rotated or pivoted, the mounting bracket 444 pivots relative to the socket element 418b while the socket element 418b remains in its set position at the mirror stay (as set by the driver when setting his or her desired rearward view). Thus, when the toggle mechanism 424 is pivoted relative to the socket mounting bracket 444 between the daytime mode (FIG. 35), the nighttime mode (FIG. 36) and the display mode (FIG. 37), the cam follower 446 travels along the arcuate channel 450a of the arcuate cam 450 and the distance between the pivot axis of the toggle mechanism 424 (as defined by the pivot pin) and the cam follower 446 changes to cause the socket mounting bracket 444 to pivot relative to the socket member 418b.

Thus, the arcuate cam 450 of the toggle mechanism 424 attaches to the cam follower 446 and the star cam 454 attaches to the arcuate cam 450, so that the toggle tab 448 pivots to pivot the star cam 454 and the arcuate cam 450 together. The star cam 454 provides detents so the pivoting stops at respective positions corresponding to each mode (via the star cam 454 engaging the arm or spring finger 456). When the arcuate cam 450 is pivoted, the cam follower 446 at the socket element 418b travels along the channel 450a in the arcuate cam 450, which causes the toggle mechanism 424, reflective element, display, and mirror casing to pivot relative to the socket element 418b to change modes of the mirror.

Furthermore, the CMS of the vehicle may include IR or near IR light emitters at or near the CMS cameras so that, when the IR light emitters are electrically operated to emit light, the IR light illuminates the field of view of the CMS cameras. The CMS cameras may capture image data of visible light and image data of IR light and the image processor may process both sets of image data to provide a higher quality image. That is, the image processor may stich or overlay the visible light images and the IR images together. This may reduce nose and/or adjust gains on the image sensor of the CMS cameras. Further, processing both captured visible light image data and captured IR light image data improves visibility of the CMS system during nighttime and low-light driving conditions.

Moreover, icons and other graphical overlays and user interface elements that are displayed at the video display screen (e.g., lines overlaid on video images that represent the vehicle's path of travel, alert icons for detected objects, and the like) may traditionally be rendered via stored raw Bitmap pixel by pixel representation, which consumes large portions of memory storage.

Thus, the system compresses, decodes and rasterizes images to reduce the amount of data stored in memory to enable the graphical images, icons and other user interface aspects. That is, the system determines common traits, properties and aspects of one or more images to be stored, generates a lookup table for each unique aspect of the image, and generates process map instructions to decode the image when the image is rendered. The runtime system of the digital mirror display then follows the instructions for the lookup tables and process map to render the image. The data stored in memory is significantly less than the traditional method of using raw formatting of pixel to pixel representation.

Additionally, one or more lens elements or optic elements of the CMS camera may include an electrochromic lens element. That is, the lens element includes a first glass substrate, a second glass substrate, and an electrochromic medium sandwiched between the first and second glass substrates. When an electric current is applied to the electrochromic medium, a tint or light transmissivity of the lens element is adjusted responsive to the electric current. Thus, when light levels at the camera are high (e.g., during daytime driving conditions, when the camera is viewing direct sunlight, when light from the headlights of other vehicles or other stray light sources are directed toward the camera, and the like), the lens element may be darkened or dimmed to reduce the light exposure at the imager of the camera. When light levels at the camera are relatively low (e.g., during nighttime driving conditions), the darkening or dimming of the lens element may be reduced to allow greater light exposure at the imager of the camera.

When the electrochromic lens element is not being operated to decrease light transmissivity of the lens during night driving, the image processor of the CMS may overcompensate for headlights of other vehicles and other bright lights directed at the camera, causing a blooming or glare effect surrounding the headlights in the generated video image. When the vehicle is being driven during the day and the sun enters the camera's field of view (e.g., during sun rise or sun set), this may produce a distracting lens flare effect, a washed out image, or another negative impact to the quality of displayed image when the electrochromic lens element is not being operated to decrease light transmissivity of the lens. Additionally, the image quality for other areas of the image degrade as the image processor attempts to correct the glare effect of the image.

Thus, when the image processor detects a large increase in exposure, the system could darken or dim the electrochromic lens element of the camera to physically filter some light. That is, the camera could "put sunglasses on." The system may adjust the darkening or dimming of the electrochromic lens element based on a level of exposure at the imager. Actively adjusting the light filtering at the lens may increase the quality of ADAS and CMS systems without solely relying on software or processing manipulation of the image. That is, a physically active part of the camera may be an improvement to the current passive lens stack. Further, the electrochromic lens element may be incorporated in CMS cameras and ADAS and other camera applications.

The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties.

The reflective element and mirror casing are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mounting base includes an attaching portion that is configured to be attached to an interior surface of a vehicle windshield (such as to a mounting button or attachment element adhered to the interior surface of the vehicle windshield or such as to a headliner or overhead console of the vehicle). The mounting base may comprise a metallic ball portion or may comprise a molded (such as injection molded) polymeric mounting base or may be otherwise formed, depending on the particular application of the mirror assembly.

Optionally, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736; and/or US-2010-0097469, which are all hereby incorporated herein by reference in their entireties.

Optionally, the DMS camera may be used to detect ambient light and/or glare light (emanating from headlamps of a trailing vehicle) for use in providing auto-dimming of the EC mirror reflective element. The DMS camera may be disposed in the mirror head and viewing rearward through the mirror reflective element. The processing of image data captured by the DMS camera may be adjusted to accommodate the angle of the mirror head so that the ECU or system, via image processing of image data captured by the DMS camera, determines headlamps of a trailing vehicle (behind the equipped vehicle and traveling in the same direction as the equipped vehicle and traveling in the same traffic lane or in an adjacent traffic lane) to determine glare light at the mirror reflective element. The processing of image data captured by the DMS camera is adjusted to accommodate the degree of dimming of the mirror reflective element. For example, the system knows how much the mirror reflective element is dimmed (responsive to the determined glare light intensity and location) and can accommodate for the mirror dimming level when processing captured image data to determine presence and intensity of light sources/headlamps rearward of the vehicle. The intelligent/automatic mirror dimming functions may utilize aspects of the systems described in U.S. Pat. Nos. 11,242,008; 10,948,798 and/or 10,967,796, and/or International Publication No. WO 2022/150826, which are all hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:
    a mirror head adjustable relative to a mounting base, wherein the mounting base is configured to mount the vehicular interior rearview mirror assembly at an interior portion of an interior cabin of a vehicle;
    wherein the mirror head accommodates a mirror reflective element and a video display device, and wherein the mirror reflective element includes a transflective mirror reflector, and wherein the video display device is disposed behind the mirror reflective element;
    wherein, with the vehicular interior rearview mirror assembly mounted at the interior portion of the interior cabin of the vehicle, the mirror head is adjustable by a driver of the vehicle to set a rearward view for the driver;
    wherein, with the vehicular interior rearview mirror assembly mounted at the interior portion of the interior cabin of the vehicle, the video display device is operable to display video images derived from image data captured by a camera of the vehicle, the displayed video images being viewable through the transflective mirror reflector of the mirror reflective element by the driver of the vehicle viewing the mirror reflective element; and
    wherein, with the vehicular interior rearview mirror assembly mounted at the interior portion of the interior cabin of the vehicle, and when the video display device is operated to display video images, and responsive to determination of a glare light source present in a field of view of the camera, intensity of a portion of the displayed video images that corresponds to the glare light source is reduced relative to adjacent portions of the displayed video images.

2. The vehicular interior rearview mirror assembly of claim 1, wherein determination of the glare light source present in the field of view of the camera is based on processing of the image data captured by the camera.

3. The vehicular interior rearview mirror assembly of claim 1, wherein determination of the glare light source present in the field of view of the camera is based on intensity of visible light emitted by the video display device at a region of the video display device corresponding to the portion of the displayed video images.

4. The vehicular interior rearview mirror assembly of claim 1, wherein a driver monitoring camera is accommodated by the mirror head, and wherein the driver monitoring camera captures image data.

5. The vehicular interior rearview mirror assembly of claim 4, wherein the driver monitoring camera views through the transflective mirror reflector of the mirror reflective element to view at least a driver's head region within the interior cabin of the vehicle.

6. The vehicular interior rearview mirror assembly of claim 5, wherein a near infrared light emitter is accommodated by the mirror head, and wherein the near infrared light emitter, when electrically operated, emits near infrared light that passes through the transflective mirror reflector of the mirror reflective element to illuminate at least the driver's head region within the interior cabin of the vehicle.

7. The vehicular interior rearview mirror assembly of claim 4, wherein, when the video display device is operated to display video images, intensity of at least portions of the displayed video images is adjustable based on an ambient light level within the interior cabin of the vehicle, and wherein the ambient light level is determined based on processing of image data captured by the driver monitoring camera.

8. The vehicular interior rearview mirror assembly of claim 4, wherein the mirror head accommodates electronic circuitry, and wherein the electronic circuitry comprises a processor operable to process image data captured by the driver monitoring camera, and wherein, with the vehicular interior rearview mirror assembly mounted at the interior portion of the interior cabin of the vehicle, the processor processes image data captured by the driver monitoring camera to determine at least one selected from the group consisting of (i) driver attentiveness, (ii) driver drowsiness and (iii) driver gaze direction.

9. The vehicular interior rearview mirror assembly of claim 1, wherein the video display device comprises a plurality of light sources that, when the video display device is electrically operated to display video images, emit light to provide the displayed video images, and wherein the plurality of light sources are independently adjustable to adjust intensity of portions of the displayed video images at discrete regions of the video display device.

10. The vehicular interior rearview mirror assembly of claim 9, wherein the plurality of light sources comprise one selected from the group consisting of (i) light emitting diodes (LEDs), (ii) microLEDs and (iii) organic light emitting diodes (OLEDs).

11. The vehicular interior rearview mirror assembly of claim 1, wherein the mirror reflective element comprises a prismatic mirror reflective element.

12. The vehicular interior rearview mirror assembly of claim 11, comprising a toggle that is movable between (i) a first position to adjust the prismatic mirror reflective element to a daytime position, (ii) a second position to adjust the prismatic mirror reflective element to a nighttime position and (iii) a third position to adjust the prismatic mirror reflective element to a digital display position.

13. The vehicular interior rearview mirror assembly of claim 12, wherein, with the prismatic mirror reflective element adjusted to the nighttime position, the prismatic mirror reflective element is pivoted relative to the daytime position, and wherein, with the prismatic mirror reflective element adjusted to the digital display position, the prismatic mirror reflective element is further pivoted relative to the nighttime position.

14. The vehicular interior rearview mirror assembly of claim 13, wherein the toggle pivots about a pivot axis when moved between the first position, the second position and the third position, and wherein the pivot axis of the toggle is pitched together and in tandem with the prismatic mirror reflective element relative to the mounting base when the prismatic mirror reflective element is adjusted between the daytime position, the nighttime position and the digital display position.

15. The vehicular interior rearview mirror assembly of claim 14, wherein the toggle is pivotally coupled to the mounting base, and wherein the toggle comprises an arcuate cam that engages structure at the mounting base to pitch the toggle and prismatic mirror reflective element relative to the mounting base when the toggle is moved between the first position, the second position and the third position.

16. The vehicular interior rearview mirror assembly of claim 14, wherein the toggle comprises a detent interface, and wherein the detent interface is engaged when the toggle is moved to the first position, the second position and the third position, and wherein the detent interface is biased toward engagement.

17. The vehicular interior rearview mirror assembly of claim 1, wherein the mounting base comprises an electrically operable actuator, and wherein the electrically operable actuator comprises an electrically operable motor that, with the vehicular interior rearview mirror assembly mounted at the interior portion of the interior cabin of the vehicle, and when the electrically operable actuator is electrically operated to adjust a position of the mirror head to adjust the rearward view for the driver, drives a spherical gear element to adjust the position of the mirror head about the spherical gear element.

18. The vehicular interior rearview mirror assembly of claim 1, wherein the camera comprises an electrochromic lens element, and wherein the electrochromic lens element, when the camera is capturing video images, and responsive to an electric current applied to an electrochromic medium of the electrochromic lens element, is dimmable to adjust intensity of light that passes through the electrochromic lens element.

19. The vehicular interior rearview mirror assembly of claim 1, wherein the camera comprises a rearward viewing camera of the vehicle.

20. The vehicular interior rearview mirror assembly of claim 19, wherein the displayed video images are representative of the rearward view for the driver.

21. The vehicular interior rearview mirror assembly of claim 1, wherein only intensity of the portion of the displayed video images that corresponds to the glare light source is reduced and intensity of other portions of the displayed video images that do not correspond to the glare light source are not reduced.

22. A vehicular interior rearview mirror assembly, the vehicular interior rearview mirror assembly comprising:
a mirror head adjustable relative to a mounting base, wherein the mounting base is configured to mount the vehicular interior rearview mirror assembly at an interior portion of an interior cabin of a vehicle;
wherein the mirror head accommodates a mirror reflective element and a video display device, and wherein the mirror reflective element includes a transflective mirror reflector, and wherein the video display device is disposed behind the mirror reflective element;
wherein, with the vehicular interior rearview mirror assembly mounted at the interior portion of the interior cabin of the vehicle, the mirror head is adjustable by a driver of the vehicle to set a rearward view for the driver;
wherein, with the vehicular interior rearview mirror assembly mounted at the interior portion of the interior cabin of the vehicle, the video display device is operable to display video images derived from image data captured by a camera of the vehicle, the displayed video images being viewable through the transflective mirror reflector of the mirror reflective element by the driver of the vehicle viewing the mirror reflective element;
wherein the camera comprises a rearward viewing camera of the vehicle, and wherein the displayed video images are representative of the rearward view for the driver;
wherein the video display device comprises a plurality of light sources that, when the video display device is electrically operated to display video images, emit light to provide the displayed video images, and wherein the plurality of light sources are independently adjustable to adjust intensity of portions of the displayed video images at discrete regions of the video display device; and
wherein, with the vehicular interior rearview mirror assembly mounted at the interior portion of the interior cabin of the vehicle, and when the video display device is operated to display video images, and responsive to determination of a glare light source present in a field of view of the camera, intensity of a portion of the displayed video images that corresponds to the glare light source is reduced relative to adjacent portions of the displayed video images.

23. The vehicular interior rearview mirror assembly of claim 22, wherein determination of the glare light source present in the field of view of the camera is based on processing of the image data captured by the camera.

24. The vehicular interior rearview mirror assembly of claim 22, wherein determination of the glare light source present in the field of view of the camera is based on intensity of visible light emitted by the video display device at a region of the video display device corresponding to the portion of the displayed video images.

25. The vehicular interior rearview mirror assembly of claim 22, wherein the mirror reflective element comprises a prismatic mirror reflective element.

26. The vehicular interior rearview mirror assembly of claim 25, comprising a toggle that is movable between (i) a first position to adjust the prismatic mirror reflective element to a daytime position, (ii) a second position to adjust the prismatic mirror reflective element to a nighttime position and (iii) a third position to adjust the prismatic mirror reflective element to a digital display position, and wherein, with the prismatic mirror reflective element adjusted to the nighttime position, the prismatic mirror reflective element is pivoted relative to the daytime position, and wherein, with the prismatic mirror reflective element adjusted to the digital display position, the prismatic mirror reflective element is further pivoted relative to the nighttime position.

27. A vehicular interior rearview mirror assembly, the vehicular interior rearview mirror assembly comprising:
  a mirror head adjustable relative to a mounting base, wherein the mounting base is configured to mount the vehicular interior rearview mirror assembly at an interior portion of an interior cabin of a vehicle;
  wherein the mirror head accommodates a prismatic mirror reflective element and a video display device, and wherein the prismatic mirror reflective element includes a transflective mirror reflector, and wherein the video display device is disposed behind the prismatic mirror reflective element;
  a toggle that is movable between (i) a first position to adjust the prismatic mirror reflective element to a daytime position, (ii) a second position to adjust the prismatic mirror reflective element to a nighttime position and (iii) a third position to adjust the prismatic mirror reflective element to a digital display position;
  wherein, with the prismatic mirror reflective element adjusted to the nighttime position, the prismatic mirror reflective element is pivoted relative to the daytime position, and wherein, with the prismatic mirror reflective element adjusted to the digital display position, the prismatic mirror reflective element is further pivoted relative to the nighttime position;
  wherein, with the vehicular interior rearview mirror assembly mounted at the interior portion of the interior cabin of the vehicle, the mirror head is adjustable by a driver of the vehicle to set a rearward view for the driver; and
  wherein, with the vehicular interior rearview mirror assembly mounted at the interior portion of the interior cabin of the vehicle, and with the prismatic mirror reflective element adjusted to the digital display position, the video display device is operable to display video images derived from image data captured by a camera of the vehicle, the displayed video images being viewable through the transflective mirror reflector of the prismatic mirror reflective element by the driver of the vehicle viewing the prismatic mirror reflective element.

28. The vehicular interior rearview mirror assembly of claim 27, wherein the video display device comprises a plurality of light sources that, when the video display device is electrically operated to display video images, emit light to provide the displayed video images, and wherein the plurality of light sources are independently adjustable to adjust intensity of portions of the displayed video images at discrete regions of the video display device.

29. The vehicular interior rearview mirror assembly of claim 28, wherein, with the vehicular interior rearview mirror assembly mounted at the interior portion of the interior cabin of the vehicle, and when the video display device is operated to display video images, and responsive to determination of a glare light source present in a field of view of the camera, intensity of a portion of the displayed video images that corresponds to the glare light source is reduced relative to adjacent portions of the displayed video images.

30. The vehicular interior rearview mirror assembly of claim 27, wherein the toggle pivots about a pivot axis when moved between the first position, the second position and the third position, and wherein the pivot axis of the toggle is pitched together and in tandem with the prismatic mirror reflective element relative to the mounting base when the prismatic mirror reflective element is adjusted between the daytime position, the nighttime position and the digital display position.

31. The vehicular interior rearview mirror assembly of claim 30, wherein the toggle is pivotally coupled to the mounting base, and wherein the toggle comprises an arcuate cam that engages structure at the mounting base to pitch the toggle and prismatic mirror reflective element relative to the mounting base when the toggle is moved between the first position, the second position and the third position.

32. The vehicular interior rearview mirror assembly of claim 31, wherein the toggle comprises a detent interface, and wherein the detent interface is engaged when the toggle is moved to the first position, the second position and the third position, and wherein the detent interface is biased toward engagement.

33. The vehicular interior rearview mirror assembly of claim 27, wherein, with the vehicular interior rearview mirror assembly mounted at the interior portion of the interior cabin of the vehicle, the video display device is operable to display video images when the prismatic mirror reflective element is adjusted to any one selected from the group consisting of (i) the digital display position, (ii) the daytime position and (iii) the nighttime position.

* * * * *